(12) United States Patent
Liu et al.

(10) Patent No.: US 8,787,338 B2
(45) Date of Patent: Jul. 22, 2014

(54) DETERMINING A COMMUNICATION CHANNEL FROM A PLURALITY OF POSSIBLE CHANNEL BANDWIDTHS

(75) Inventors: Yong Liu, Campbell, CA (US);
Hongyuan Zhang, Fremont, CA (US);
Raja Banerjea, Sunnyvale, CA (US)

(73) Assignee: Marvell World Trade Ltd., St. Michael (BB)

(*) Notice: Subject to any disclaimer, the term of this patent is extended or adjusted under 35 U.S.C. 154(b) by 226 days.

(21) Appl. No.: 13/246,351

(22) Filed: Sep. 27, 2011

(65) Prior Publication Data

US 2012/0082147 A1 Apr. 5, 2012

Related U.S. Application Data

(60) Provisional application No. 61/389,664, filed on Oct. 4, 2010, provisional application No. 61/392,614, filed on Oct. 13, 2010.

(51) Int. Cl.
| | |
|---|---|
| H04L 1/00 | (2006.01) |
| H04L 12/26 | (2006.01) |
| H04L 5/00 | (2006.01) |
| H04L 27/26 | (2006.01) |

(52) U.S. Cl.
CPC ............ H04L 5/001 (2013.01); H04L 5/0007 (2013.01); *H04L 5/00* (2013.01); *H04L 27/2601* (2013.01)
USPC ........... 370/338; 370/329; 370/311; 370/310; 370/252; 455/434

(58) Field of Classification Search
CPC ......... H04L 5/001; H04L 5/0007; H04L 5/00; H04L 27/2601
USPC ............... 455/62, 575.7, 558, 515, 507, 434, 455/41.1, 127.2, 127.1; 375/295, 260, 219, 375/455; 370/455, 338, 337, 336, 330, 329, 370/328, 312, 311, 310, 252, 241
See application file for complete search history.

(56) References Cited

U.S. PATENT DOCUMENTS

| | | |
|---|---|---|
| 5,613,194 A | 3/1997 | Olds et al. |
| 6,169,761 B1 | 1/2001 | Marcoccia et al. |

(Continued)

OTHER PUBLICATIONS

P802.11ac/D2.0, "802.11ac Draft Standard 2.0", Jan. 2012, IEEE, all pages.*

(Continued)

*Primary Examiner* — Kwang B Yao
*Assistant Examiner* — Adam Duda

(57) ABSTRACT

In a method of determining an available channel bandwidth in a communication system, wherein the communication system utilizes i) a set of component channels for transmitting data streams and ii) a set of access control channels, and wherein each of at least some of the access control channels partially overlaps, in frequency, at least one of the component channels, whether a primary channel of the access control channels is idle is determined. The primary channel partially overlaps, in frequency, at least a first one of the component channels. That a composite channel includes one or more of the component channels is determined based at least on a determination of whether the primary channel is idle. A signal is caused to be transmitted via the composite channel after determining that the composite channel includes one or more of the component channels.

27 Claims, 18 Drawing Sheets

(56) References Cited

U.S. PATENT DOCUMENTS

| | | | |
|---|---|---|---|
| 8,345,584 | B2 | 1/2013 | Rohfleisch et al. |
| 2006/0146869 | A1 | 7/2006 | Zhang et al. |
| 2006/0217125 | A1 | 9/2006 | Miyazaki |
| 2006/0268760 | A1 | 11/2006 | Fang et al. |
| 2007/0008884 | A1 | 1/2007 | Tang |
| 2007/0060155 | A1 | 3/2007 | Kahana et al. |
| 2007/0070922 | A1 | 3/2007 | Benveniste |
| 2008/0080553 | A1 | 4/2008 | Hasty et al. |
| 2008/0112340 | A1 | 5/2008 | Luebke |
| 2008/0192644 | A1 | 8/2008 | Utsunomiya et al. |
| 2009/0059877 | A1 | 3/2009 | Utsunomiya et al. |
| 2009/0067403 | A1 | 3/2009 | Chan et al. |
| 2009/0285116 | A1 | 11/2009 | Nanda et al. |
| 2010/0142468 | A1 | 6/2010 | Cheong et al. |
| 2011/0194542 | A1 | 8/2011 | Kim et al. |
| 2011/0305156 | A1 | 12/2011 | Liu et al. |
| 2011/0305288 | A1 | 12/2011 | Liu et al. |
| 2011/0310930 | A1 | 12/2011 | Gerhardt et al. |
| 2012/0057492 | A1 | 3/2012 | Goel et al. |
| 2012/0057534 | A1 | 3/2012 | Park |
| 2012/0082040 | A1 | 4/2012 | Gong et al. |
| 2012/0082045 | A1 | 4/2012 | Liu et al. |
| 2012/0082056 | A1 | 4/2012 | Horisaki et al. |
| 2012/0082147 | A1 | 4/2012 | Liu et al. |

OTHER PUBLICATIONS

P802.11ac/D3.0, "802.11ac Draft Standard 3.0", Jun. 2012, IEEE, all pages.*
P802.11ac/D4.0, "802.11ac Draft Standard 4.0", Oct. 2012, IEEE, all pages.*
P802.11ac/D5.0, "802.11ac Draft Standard 5.0", Jan. 2013, IEEE, all pages.*
P802.11ac/D6.0, "802.11ac Draft Standard 6.0", Jul. 2013, IEEE, all pages.*
Park, "IEEE 802.11ac: Dynamic Bandiwdth Channel Access", Jun. 2011, IEEE, all pages.*
Cariou et al., "Multi-channel Transmissions" (doc#: 802.11-09/1022r0), Oct. 21, 2009, IEEE Working Group, all pages.*
Stacey et al., "Specification Framework for TGac" (doc#: 802.11-09/0992r21), Jan. 19, 2011, IEEE, all pages.*
Stacey(2) et al., "Specification Framework for TGac" (doc#: 802.11-09/0992r18), Sep. 16, 2010, IEEE, all pages.*
International Search report and Written Opinion for International Application No. PCT/US2011/053437, dated Jun. 14, 2012.
Partial International Search Report for International Application No. PCT/US2011/053437, dated Feb. 8, 2012.
Cariou, et al. "Multi-channel Transmissions," *The Institute of Electrical and Electronics Engineers*, doc. No. IEEE 802.11-09/1022r0, (Oct. 2009).
Hiertz, et al., "The IEEE 802.11 Universe," IEEE Communications Magazine, pp. 62-70, Jan. 2010.
Park, "IEEE 802.11ac: Dynamic Bandwidth Channel Access," IEEE ICC 2011.
Redieteab, et al., "Cross-Layer Multichannel Aggregation for Future WLAN Systems," *Institute of Electrical and Electronics Engineers, Inc.*, 2010.
Perahia, et al., "Gigabit Wireless LANs: an overview of IEEE 802.11ac and 80211ad," *Institute of Electrical and Electronics Engineers, Inc.*, 2011.
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," The Institute of Electrical and Electronics Engineers, Inc., (1999).
IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.
Liu et al., U.S. Appl. No. 13/034,409, filed Feb. 24, 2011.
Liu et al., U.S. Appl. No. 13/152,040, filed Jun. 6, 2011.
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
Partial International Search Report for International Application No. PCT/US2011/038929, dated Feb. 16, 2012.
Yuan et al., "Carrier Aggregation for LTE-Advanced Mobile Communication Systems," IEEE Communications Magazine, pp. 88-93, Feb. 2010.
Noh, et al., "Channel Selection and Management for 11ac," Doc. No. IEEE 802.11-10/0593r1, *The Institute of Electrical and Electronics Engineers, Inc.*, May 20, 2010.
S. A. Mujtaba, "IEEE P802.11—Wireless LANs, TGn Sync Proposal Technical Specification," *The Institute of Electrical and Electronics Engineers, Inc.*, doc.: IEEE 802.1-04/0889r6, May 2005.
"IEEE P802.11nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
International Search Report and Written Opinion for International Application No. PCT/US2011/038929, dated Jun. 14, 2012.
Zhang et al., "11ac Explicit Sounding and Feedback", *The Institute of Electrical and Electronics Engineers*, doc. No. IEEE 802.11-10/1105r0, (Sep. 2010).
Stacey et al., "Specification Framework for TGac," document No. IEEE 802.11-09/0992r20, *Institute for Electrical and Electronics Engineers*, pp. 1-49, Jan. 18, 2011.
Stacey et al., "IEEE P802.11, Wireless LANs, Proposed TGac Draft Amendment," Institute of Electrical and Electronics Engineers, doc. No. IEEE 802.11-10/1361r3 (Jan. 2011).
"IEEE Std. 802.11nTM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
Office Action in U.S. Appl. No. 13/246,469 dated Jun. 10, 2013.
Office Action in U.S. Appl. No. 13/152,040 dated Apr. 8, 2013.
Office Action in U.S. Appl. No. 13/034,409 dated May 16, 2013.
Office Action in U.S. Appl. No. 13/152,044 dated Mar. 28, 2013.
Office Action in U.S. Appl. No. 13/152,044 dated Aug. 29, 2013.
Office Action in U.S. Appl. No. 13/034,421 dated Jan. 22, 2013.
Office Action in U.S. Appl. No. 13/034,421 dated Sep. 3, 2013.

* cited by examiner

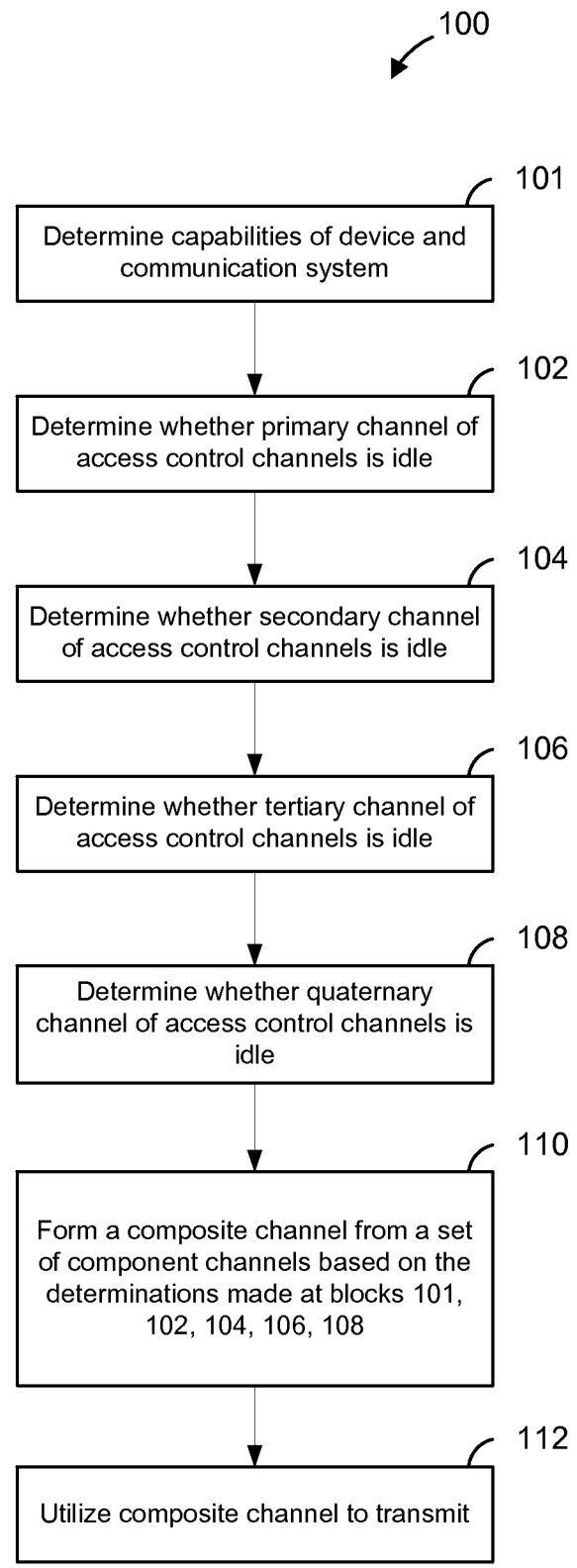

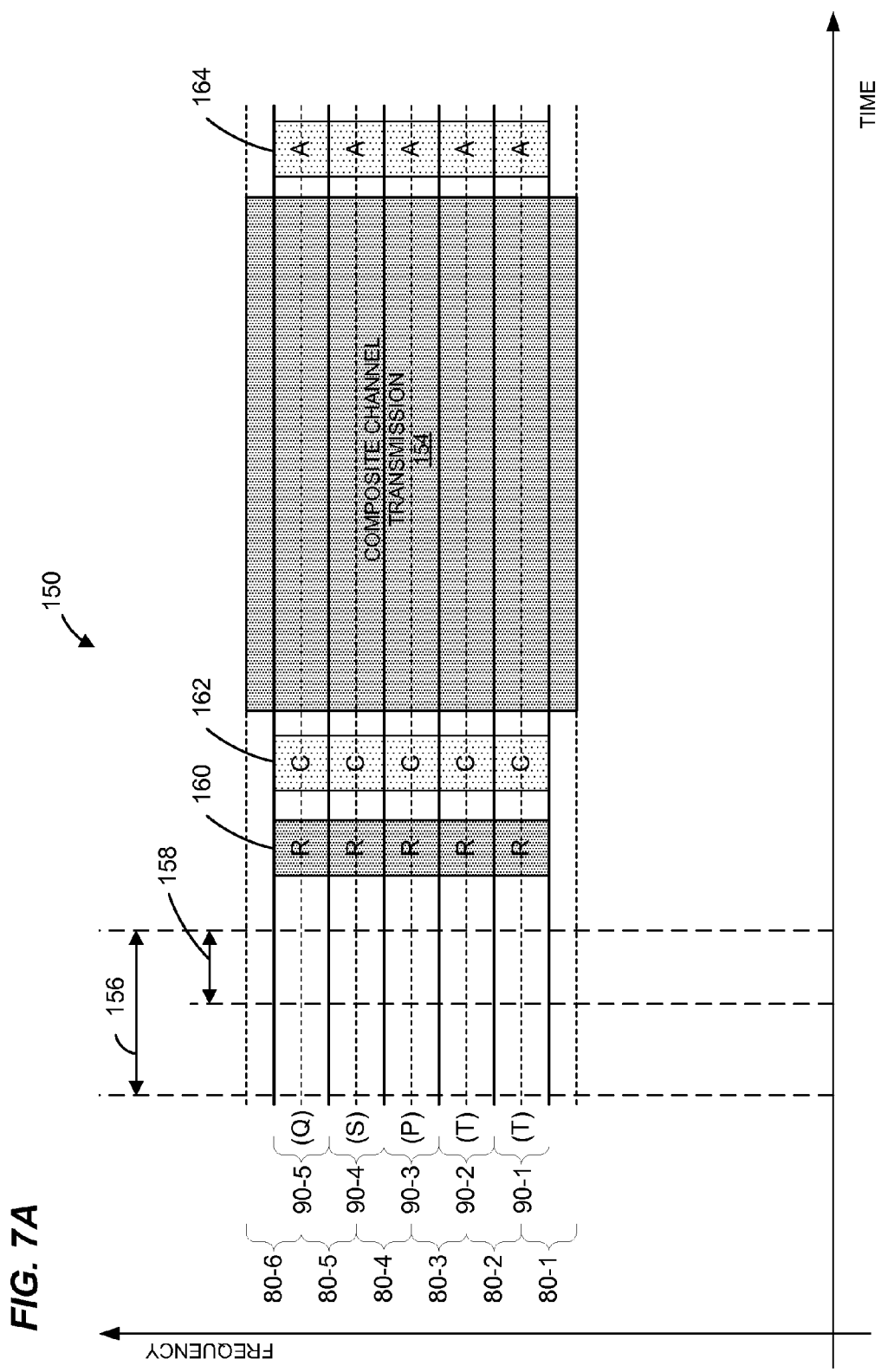

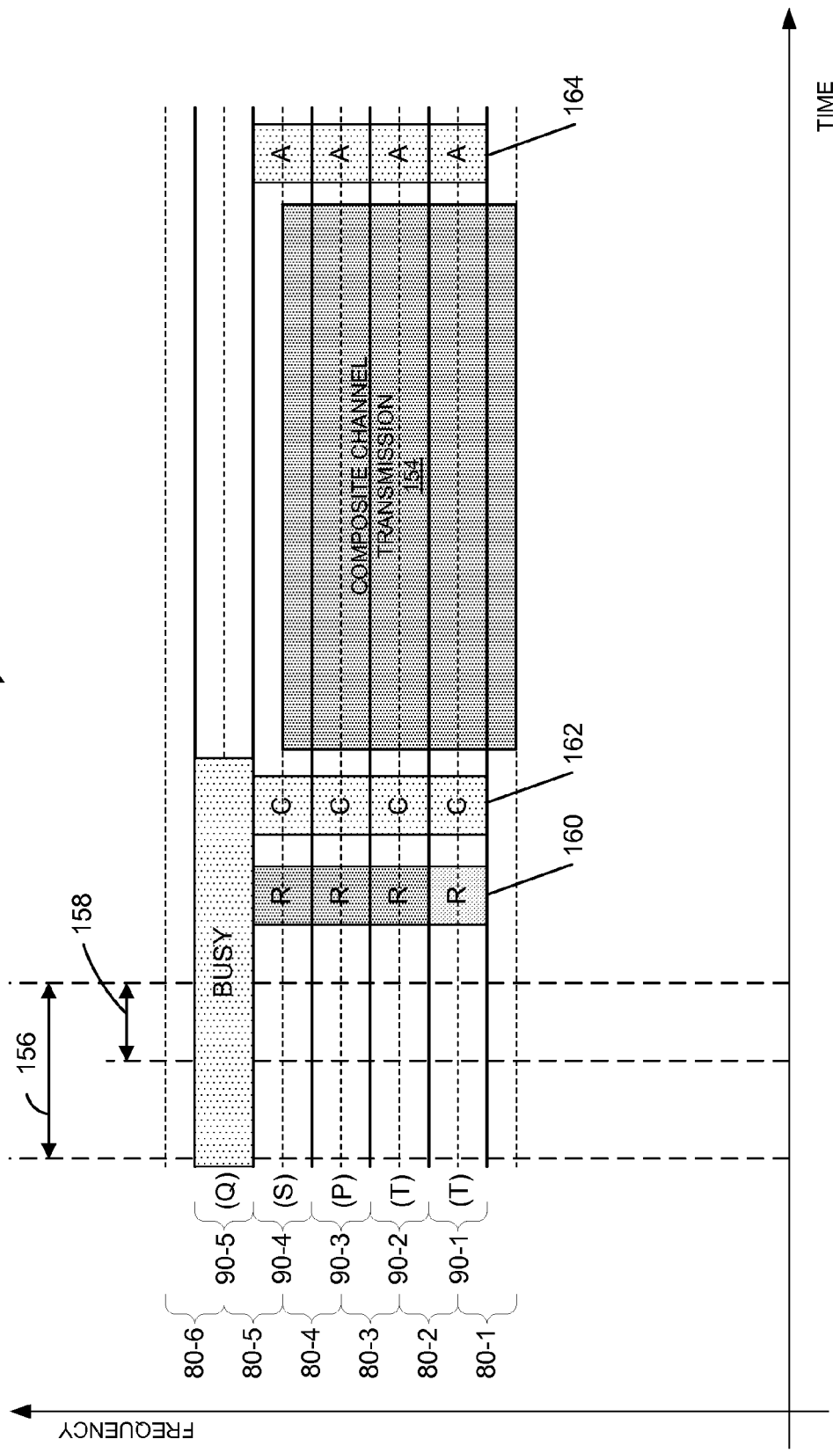

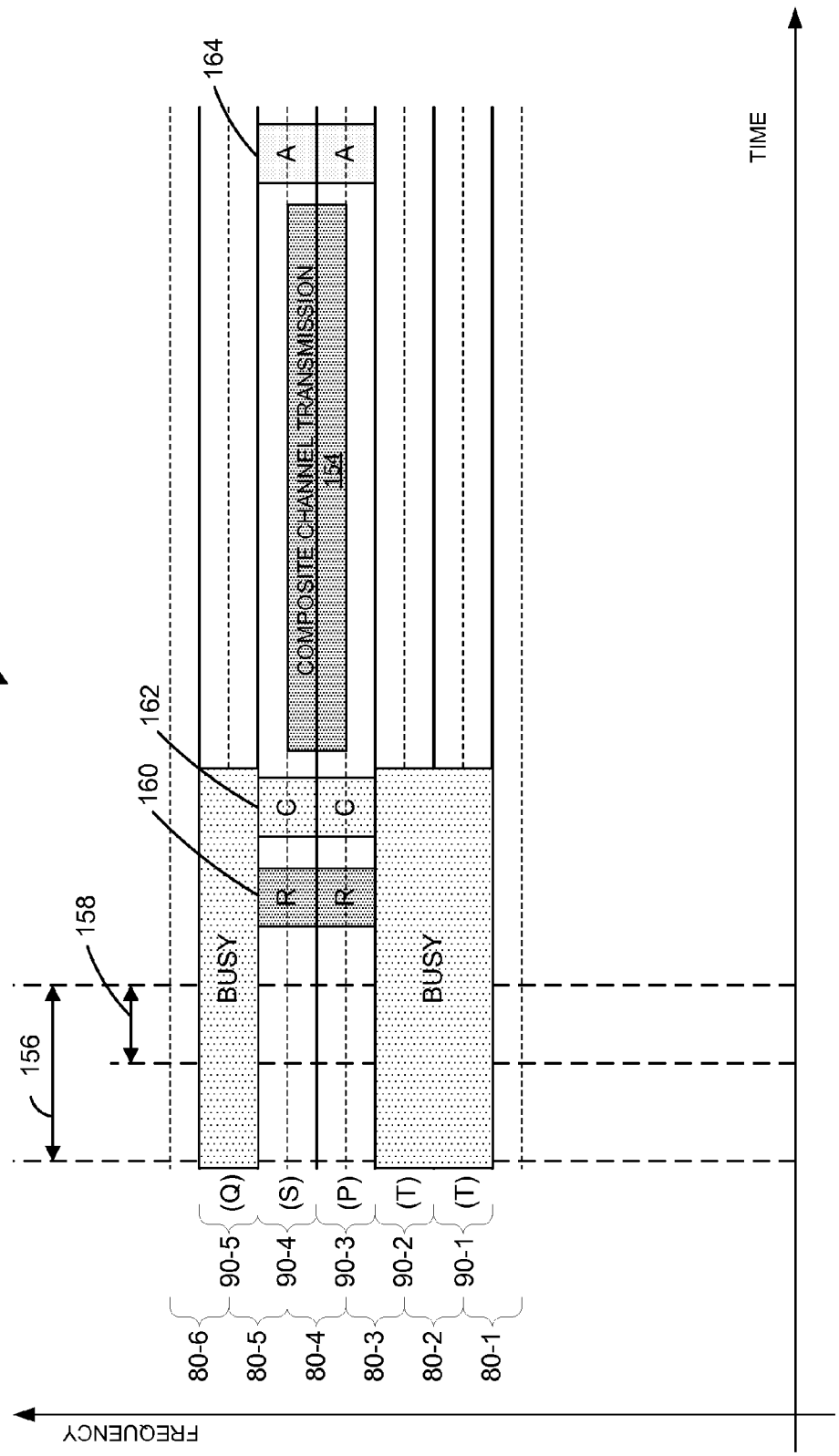

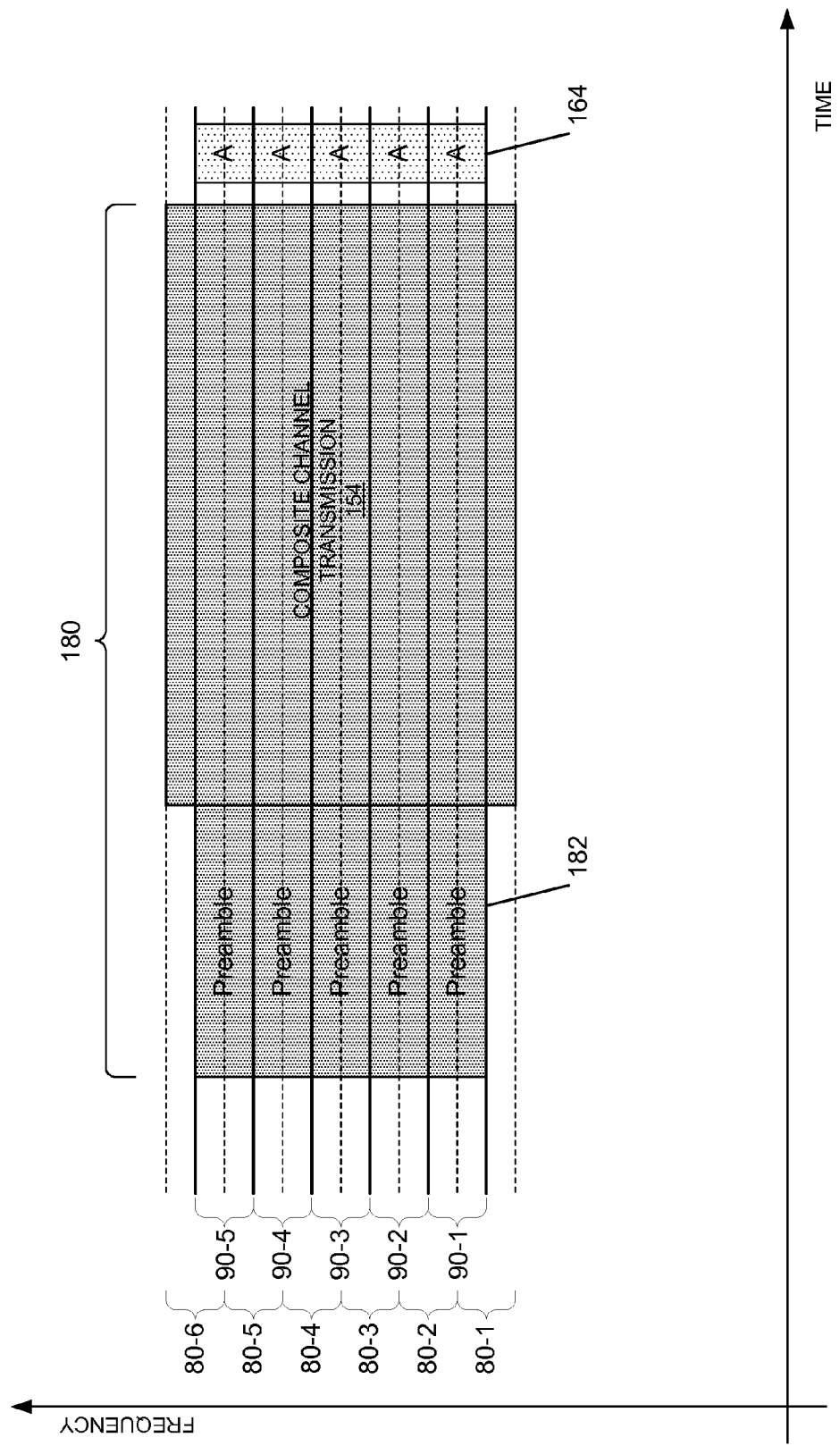

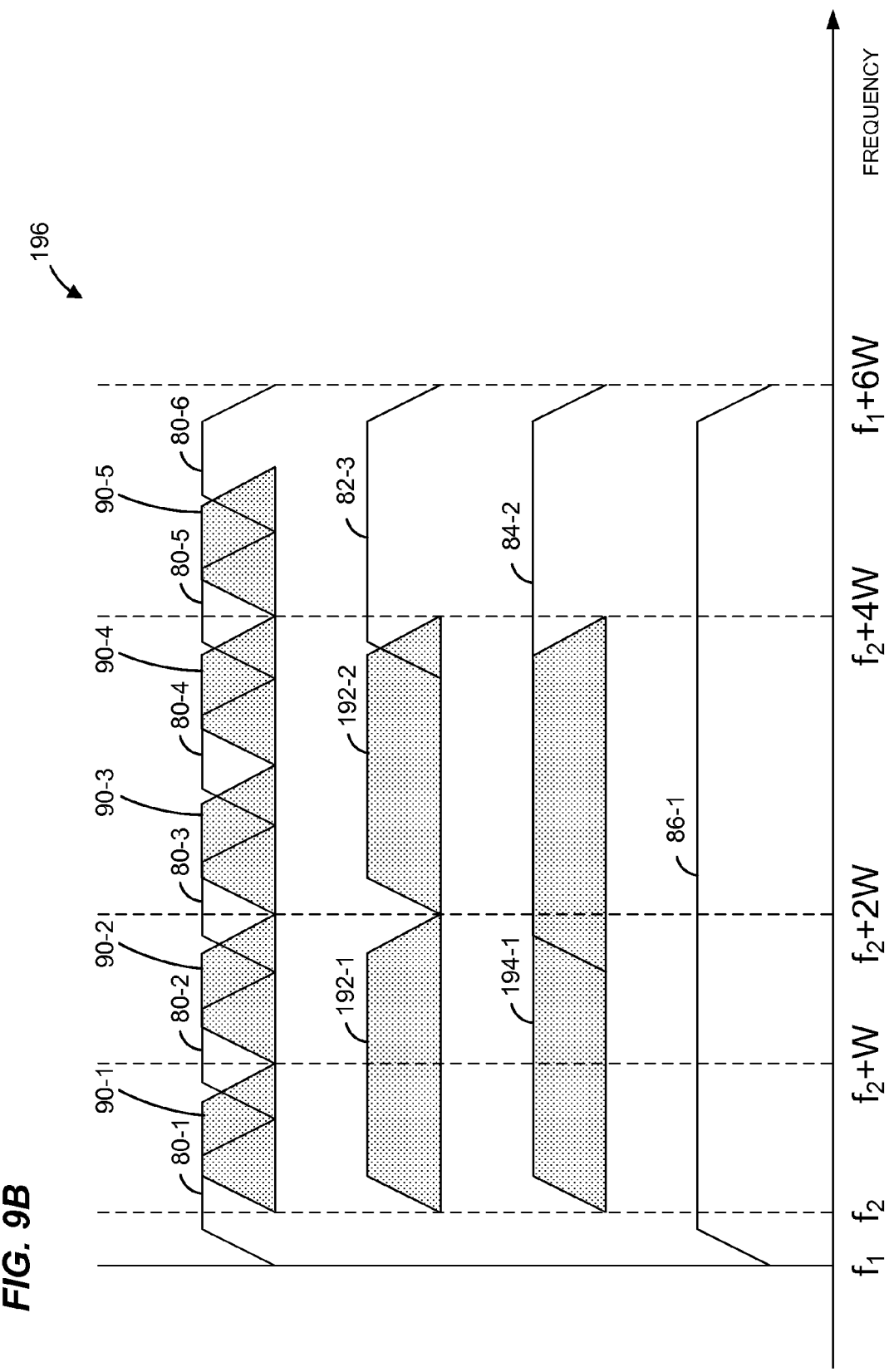

DETERMINING A COMMUNICATION CHANNEL FROM A PLURALITY OF POSSIBLE CHANNEL BANDWIDTHS

CROSS-REFERENCE TO RELATED APPLICATION

This disclosure claims the benefit of the following U.S. Provisional Patent Applications:

U.S. Provisional Patent Application No. 61/389,664, entitled "Chinese 125 MHz Band Support," filed on Oct. 4, 2010; and U.S. Provisional Patent Application No. 61/392,614, entitled "Chinese 125 MHz Band Support," filed Oct. 13, 2010.

The disclosures of both of the above-referenced patent applications are hereby incorporated by reference herein in their entireties.

The present application is related to U.S. patent application Ser. No. 13/246,469, entitled "Determining a Communication Channel from a Plurality of Possible Channel Bandwidths," filed on the same day as the present application, and which is hereby incorporated by reference herein in its entirety.

FIELD OF TECHNOLOGY

The present disclosure relates generally to communication systems and, more particularly, to wireless networks that can operate on different communication channels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method of determining an available channel bandwidth in a communication system, wherein the communication system utilizes i) a set of component channels for transmitting data streams and ii) a set of access control channels, and wherein each of at least some of the access control channels partially overlaps, in frequency, at least one of the component channels, includes determining whether a primary channel of the access control channels is idle. The primary channel partially overlaps, in frequency, at least a first one of the component channels. The method also includes determining that a composite channel includes one or more of the component channels based at least on a determination of whether the primary channel is idle. The method further includes causing a signal to be transmitted via the composite channel after determining that the composite channel includes one or more of the component channels.

In another embodiment, a communication device includes a network interface configured to determine whether a primary channel of a set of access control channels is idle. Each of the access control channels partially overlaps, in frequency, at least one channel of a set of component channels. The network interface is also configured to determine that a composite channel includes one or more of the component channels based at least on a determination of whether the primary channel is idle. The network interface is further configured to cause a signal to be transmitted via the composite channel after determining that the composite channel includes one or more of the component channels.

In another embodiment, a method of determining an available channel bandwidth in a communication system, wherein the communication system utilizes i) a set of component channels and ii) at least one channel of a set of access control channels for transmitting data streams, includes determining which channels of the set of access control channels are idle. Each of the access control channels partially overlaps, in frequency, at least one of the component channels. The method also includes determining that a composite channel includes one or more channels of a set of channels. The set of channels is chosen from i) the set of component channels and ii) the set of access control channels based at least on a determination of which of the access control channels are idle. The method further includes causing a signal to be transmitted via the composite channel after determining that the composite channel includes one or more channels of a set of channels.

In another embodiment, a communication device includes a network interface configured to determine which channels of a set of access control channels are idle. Each of the access control channels partially overlaps, in frequency, at least one channel of a set of component channels. The network interface is also configured to determine that a composite channel includes one or more channels of a set of channels. The set of channels is chosen from i) the set of component channels and ii) the set of access control channels based at least on a determination of which of the access control channels are idle. The network interface is further configured to cause a signal to be transmitted via the composite channel after determining that the composite channel includes one or more channels of a set of channels.

BRIEF DESCRIPTION OF THE DRAWINGS

FIG. 6 is a flow diagram of an example method for determining and utilizing a composite communication channel formed from one or more component channels based on a determination of which channels of a set of access control channels are idle, according to an embodiment.

FIG. 7A is a diagram of an example transmission in a communication system utilizing a composite channel based on a determination of which channels of a set of access control channels are idle, according to an embodiment.

FIG. 7B is a diagram of another example transmission in a communication system utilizing a composite channel based on a determination of which channels of a set of access control channels are idle, according to an embodiment.

FIG. 7C is a diagram of yet another example transmission in a communication system utilizing a composite channel based on a determination of which channels of a set of access control channels are idle, according to an embodiment.

FIG. 8A is a diagram of an example transmission in a communication system utilizing a composite channel having a preamble in the access control channels, according to an embodiment.

FIG. 9B is a diagram illustrating further examples of channels utilized for data stream transmission and/or access control by a communication system such as the system of FIG. 1, according to an embodiment.

DETAILED DESCRIPTION

Figure 1:
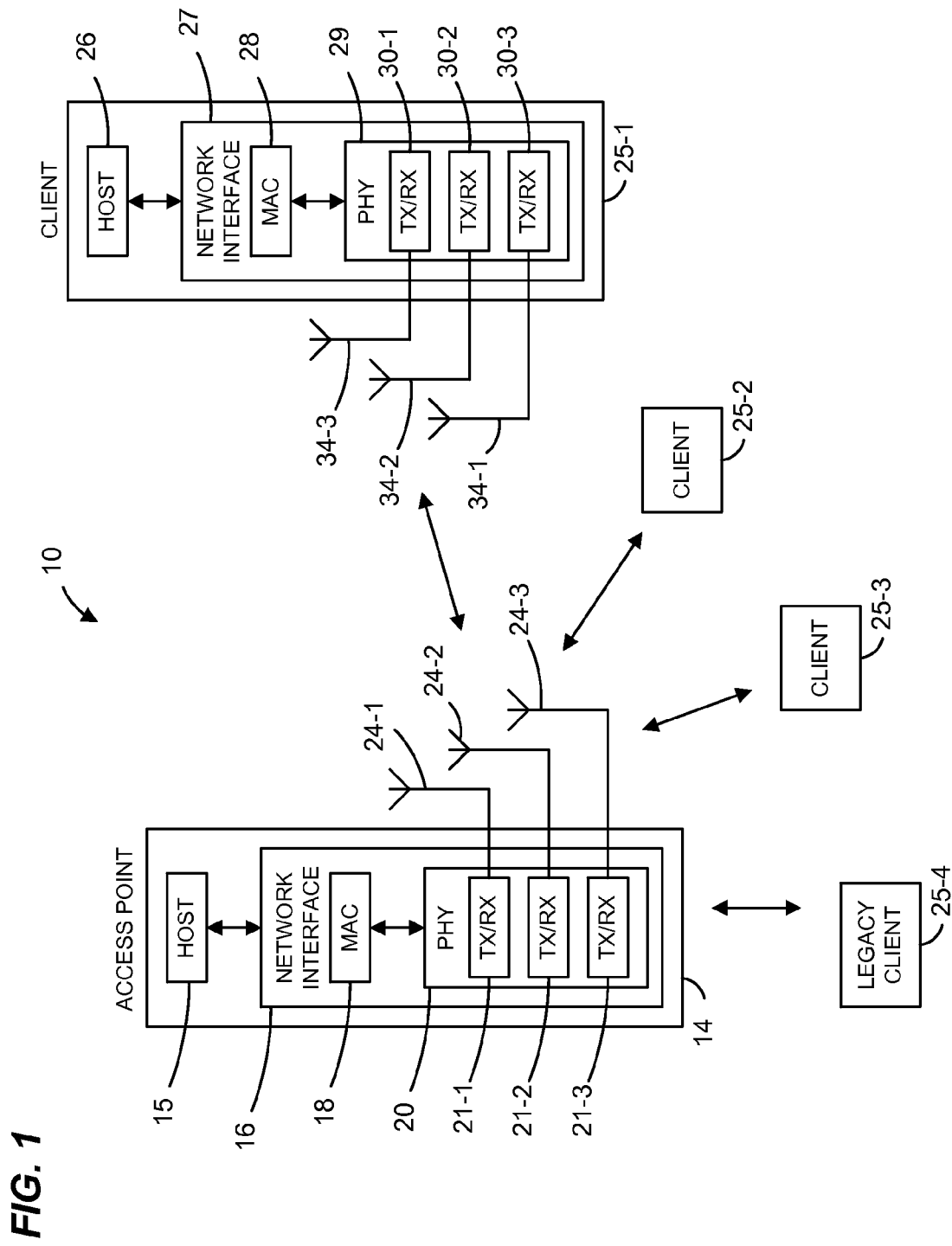
FIG. 1 is a block diagram of an example system that utilizes channel access techniques of the present disclosure, according to an embodiment.

In embodiments described below, a first communication device, such as an access point (AP) of a wireless local area network (WLAN), transmits a data stream to a second communication device, such as a client station, via a composite communication channel formed using a set of one or more component channels, where a component channel is included or excluded from the composite channel based on status (e.g., busy or idle) of one or more access control channels. Generally, and subject in some embodiments to certain combination rules, a particular component channel is available for use in forming the composite channel if each of the access control channels that overlaps a part of that component channel is idle (i.e., not busy), in some embodiments. In some embodiments, a first communication device can form a composite channel from one or more channels of a set of channels, where the set of channels is chosen from a set of one or more component channels and a set of one or more access control channels, depending on which access control channels are idle.

In some embodiments, each access control channel partially overlaps one or more of the component channels. As used herein, a first channel is said to "overlap" a second channel if at least a portion of the first channel occupies the same frequency as at least a portion of the second channel, regardless of whether the two channels are coextensive in frequency (i.e., regardless of whether the two channels have the same beginning and end frequencies), and regardless of whether one channel includes the entirety of the other channel. Also as used herein, a first channel is said to "partially overlap" a second channel if the first and second channels intersect in frequency without either channel being entirely included within the other.

In some embodiments, the access control channels are non-overlapping channels all having the same bandwidth, and in some embodiments, the component channels are non-overlapping channels all having the same bandwidth. Each of the access control channels may have the same bandwidth as each of the component channels, in some embodiments. The total bandwidth of a combination of all the component channels may be greater than the total bandwidth of a combination of all the access control channels, in some embodiments.

In some embodiments, some or all of the access control channels used by the first and second communication devices are identical to a set of communication channels used by a third communication device (e.g., a second AP) to transmit a data stream to a fourth communication device (e.g., a second client station). The third and fourth communication devices may be a part of a basic service set (BSS) different than a BSS that includes the first and second communication devices, for example.

In an embodiment, a first communication device transmits a first portion of a data frame using access control channels that are determined to be idle, and a second portion of the data frame using a composite channel formed using one or more of the component channels. The first portion of the data frame is a first preamble containing a first set of training fields, in an embodiment. The second portion of the data frame includes both a second preamble containing a second set of training fields and a data portion, in an embodiment.

FIG. 1 is a block diagram of an example WLAN 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol that supports aggregating three or more communication channels into a composite communication channel (e.g., the IEEE 802.11ac Standard, now in the process of being standardized), which is referred to herein as a "very high throughput (VHT) protocol." In another embodiment, the MAC unit 18 and the PHY unit 20 are also configured to operate according to a second communication protocol that supports aggregating at most two communication channels into a composite communication channel (e.g., the IEEE 802.11n Standard), which is referred to herein as a "high throughput (HT) protocol." In yet another embodiment, the MAC unit 18 and the PHY unit 20 are additionally configured to operate according to the second communication protocol and a third communication protocol that does not support aggregating communication channels into a composite communication channel (e.g., the IEEE 802.11a Standard)), which is referred to herein as a "legacy protocol."

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 (e.g., client station 25-4) is not configured to operate according to the first communication protocol but is configured to operate according to at least one of the second communication protocol or the third communication protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3 has a structure the same as or similar to the client station 25-1. In these embodiments, the client stations 25 structured like the client station 25-1 have the same or a different number of transceivers and antennas. For example, the client station 25-2 has only two transceivers and two antennas, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol.

In various embodiments, the PHY processing unit 20 of the AP 14 is configured to generate data units conforming to the first communication protocol and having formats described hereinafter. The transceiver(s) 21 is/are configured to transmit the generated data units via the antenna(s) 24. Similarly, the transceiver(s) 21 is/are configured to receive the data units via the antenna(s) 24. The PHY processing unit 20 of the AP 14 is configured to process received data units conforming to the first communication protocol and having a format described below, according to various embodiments.

In various embodiments, the PHY unit 29 of the client station 25-1 is configured to generate data units conforming to the first communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY unit 29 of the client station 25-1 is configured to process received data units conforming to the first communication protocol and having a format described below, according to various embodiments.

In some embodiments, a communication device in a wireless communication system such as the system 10 of FIG. 1 (e.g., the AP 14 and/or the client station 25-1) maintains a network allocation vector (NAV) which is used to keep track of a duration of a current transmission. In some embodiments, the NAV is a counter. For example, when a communication device receives a valid frame indicating a duration of an upcoming transmission to the device, the device sets the NAV to the duration indicated.

Figure 2:
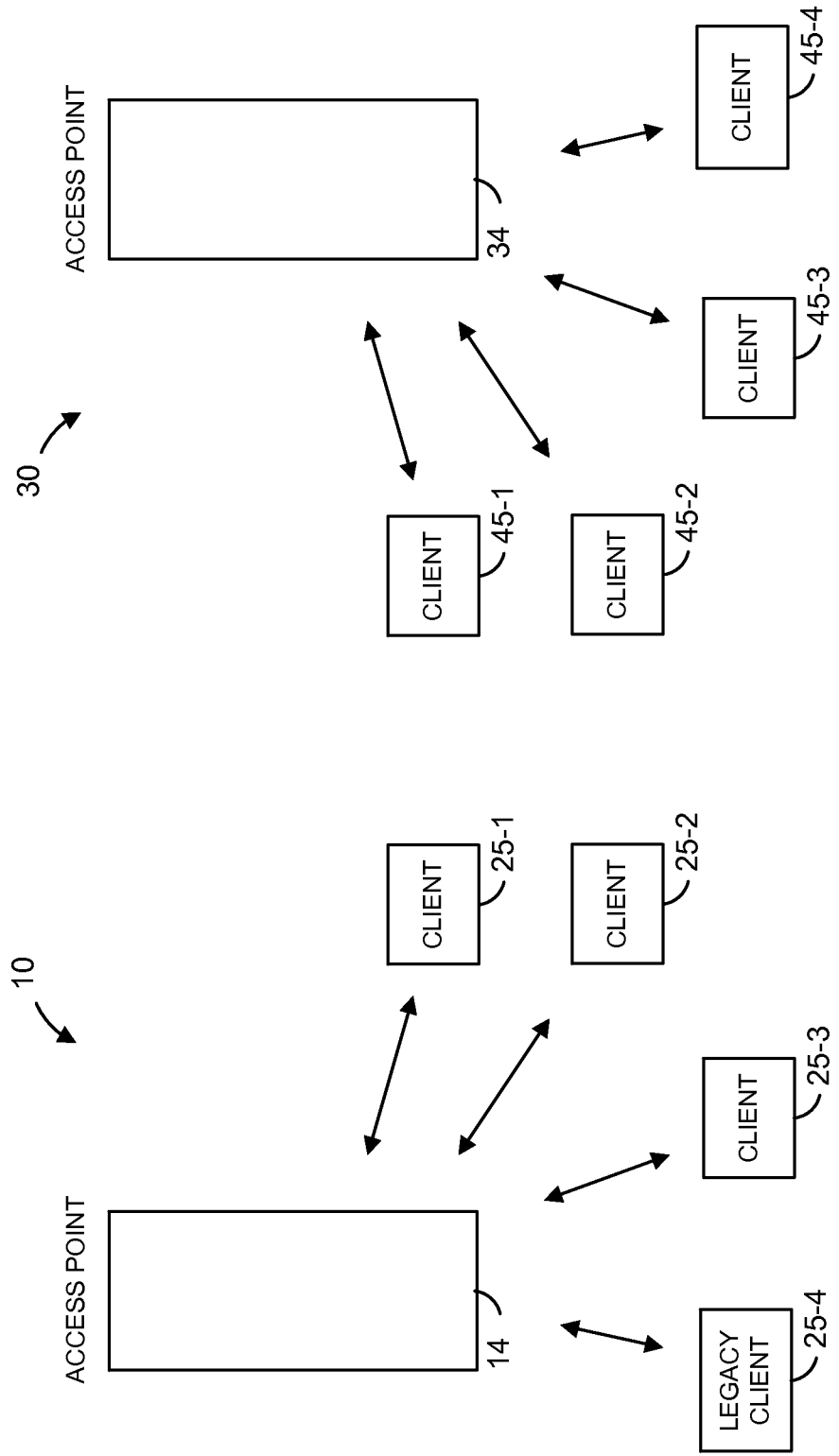
FIG. 2 is a block diagram of an example of an environment in which a system such as the system of FIG. 1 operates, according to an embodiment.

FIG. 2 is a block diagram of an example of an environment in which a system such as the system 10 of FIG. 1 operates, according to an embodiment. In an embodiment, the WLAN 10 that includes the AP 14 and client stations 25 is included in a first BSS, and is similar to the WLAN 10 of FIG. 1, for example. The WLAN 10 is in proximity to another WLAN 30, which is included in a second BSS, in an embodiment. The WLAN 30 includes an AP 34 which is similar to the AP 14 and client stations 45 which may be similar to the client stations 25, in an embodiment. The AP 34 and client stations 45 of the WLAN 30 include MAC and PHY processing units that operate according to one or more of the same protocol(s) used by the AP 14 and client stations 25 of the WLAN 10, in an embodiment. For example, the AP 34 is configured to operate according to the first communication protocol (and possibly the second and/or third communication protocol), and the client stations 45 (e.g., client station 45-1) are configured to operate at least according to the first communication protocol, in an embodiment. As another example, one or more of the client stations 45 is a legacy client station as discussed above, in an embodiment.

In some embodiments, the AP 34 and client stations 45 of the WLAN 30 utilize a set of communication channels that overlaps the set of communication channels utilized by the AP 14 and client stations 25 of the WLAN 10. In one scenario, the WLAN 30 communication channels are arranged to make efficient use of IEEE 802.11 frequency bands within the United States (e.g., including the frequency band between 5735 and 5835 MHz), while the WLAN 10 communication channels are arranged to make efficient use of a currently planned Chinese band for IEEE 802.11 standard communications (i.e., a frequency band between 5725 and 5850 MHz). Where the communication channels utilized by the WLAN 30 and the WLAN 10 overlap in a manner such as this, transmissions within WLAN 30 channels can cause interference that significantly degrades the signal quality of simultaneous transmissions within the WLAN 10 channels, and vice versa.

Figure 3:
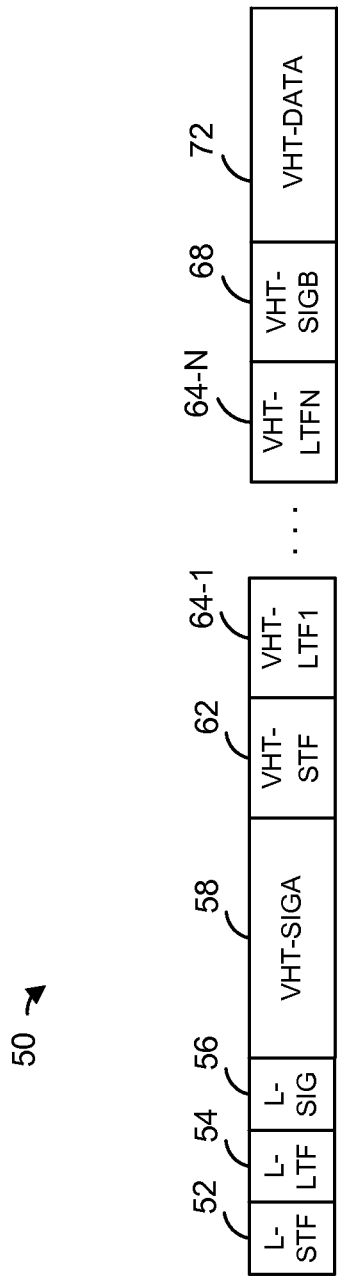
FIG. 3 is a diagram of an example data unit format, according to an embodiment.

FIG. 3 is a diagram of an example data unit 50 that a first communication device is configured to transmit to a second communication device, according to an embodiment. The data unit 50 conforms to the first communication protocol, in an embodiment. Merely for illustrative purposes, FIG. 3 will be described with reference to the example embodiment of FIG. 1. In an embodiment, the AP 14 is configured to transmit the data unit 50 to the client station 25-1 of FIG. 1, for example. In an embodiment, the client station 25-1 is also configured to transmit data units of the format of FIG. 3 to the AP 14. The data unit 50 includes a preamble having a legacy short training field (L-STF) 52, a legacy long training field (L-LTF) 54, a legacy signal field (L-SIG) 56, a first very high throughput signal field (VHT-SIGA) 58, a very high throughput short training field (VHT-STF) 62, N very high throughput long training fields (VHT-LTFs) 64, where N is an integer, and a second very high throughput signal fields (VHT-SIGB)

68. The data unit 50 also includes a data portion 72. The data portion 72 includes service bits and information bits (not shown).

In an embodiment, the VHT-LTF fields 64 of the data unit 50 include training data that allows the client station 25-1 to develop an estimate of the communication channel between the AP 14 and the client station 25-1. The number of VHT-LTF fields included in the data unit 50 generally corresponds to the number of spatial channels via which the data unit 50 is to be transmitted, in various embodiments and/or scenarios. In some embodiments, however, the number of VHT-LTF fields included in the data unit 50 exceeds the number of spatial channels via which the data unit 50 is to be transmitted, at least in some scenarios. Further, according to an embodiment, as each VHT-LTF training field is transmitted to the client station 25-1, the AP 14 applies a different mapping of symbols to the spatial streams thereby allowing the client station 25-1 to develop a full multiple input multiple output (MIMO) channel estimate of the communication channel. Further still, in an embodiment utilizing orthogonal frequency division multiplexing (OFDM), the client station 25-1 develops a channel estimate corresponding to each of the subcarrier tones.

Figure 4:
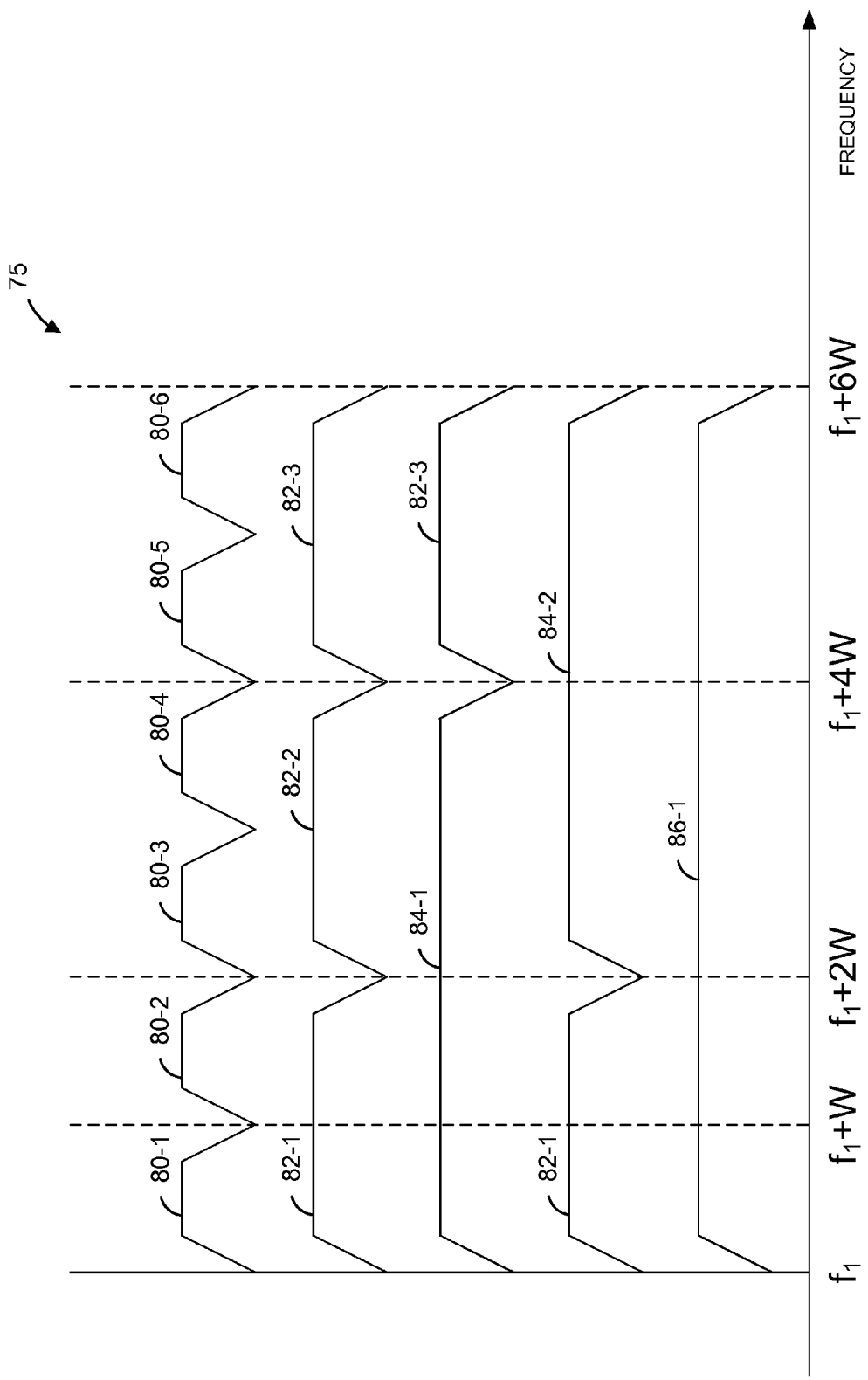
FIG. 4 is a diagram illustrating examples of channels utilized for data stream transmission by a communication system such as the system of FIG. 1, according to an embodiment.

FIG. 4 is a diagram 75 illustrating examples of communication channels utilized for data stream transmission by a communication system such as the system 10 of FIG. 1, according to an embodiment. The component channels 80 may be concatenated to form a larger communication channel. In some embodiments, there may be more or fewer component channels 80 than illustrated in FIG. 4, and/or the component channels 80 may not all have the same bandwidth. In some embodiments, two adjacent component channels 80 can be concatenated to form a channel 82. For example, component channels 80-1 and 80-2 can be concatenated to form channel 82-1. Similarly, component channels 80-3 and 80-4 can be concatenated to form channel 82-2. Moreover, in some embodiments, four adjacent component channels 80 can be concatenated to form a channel 84. For example, channels 80-1 through 80-4 can be concatenated to form channel 84-1. Similarly, channels 80-3 through 80-6 can be concatenated to form channel 84-2. Further, in some embodiments, six adjacent component channels 80 can be concatenated to form a channel 86. For example, channels 80-1 through 80-6 can be concatenated to form channel 86-1. Each channel 80 has a bandwidth of W, each channel 82 has a bandwidth of 2 W, each channel 84 has a bandwidth of 4 W, and the channel 86-1 has a bandwidth of 6 W, according to an embodiment. W is a suitable bandwidth such as 1 MHz, 5 MHz, 10 MHz, 20 MHz, etc., in some embodiments.

As discussed above, a plurality of the component channels 80 can be combined to form a composite channel. In some embodiments, a composite channel can also be formed using only one or the component channels 80. The composite channel can be used by a communication device (e.g., the AP 14 of FIG. 1) to transmit a data stream to another communication device (e.g., the client station 25-1 of FIG. 1). The data stream can include data units such as the data unit 50 of FIG. 3. In some embodiments, a composite channel is not limited to a contiguous frequency band. For example, a composite channel having a bandwidth of 4 W can be formed with component channels 80-1, 80-2, 80-4, and 80-5. As another example, component channels 80-1 and 80-4 can be combined to form a composite channel having a bandwidth of 2 W. In an embodiment that utilizes non-contiguous composite channels, the communicating devices each employ two or more radios.

In some embodiments, not all channel combinations are permissible in forming a composite channel. In an embodiment, for example, non-contiguous composite channels are not permitted. For example, a composite channel that combines only component channels 80-2 and 80-4 may not be permitted. As another example of a combination rule, in an embodiment and for a given set of component channels 80, a composite channel is not permitted to partially overlap with a channel 82. For example, a composite channel consisting of channels 80-2 and 80-3 is not permitted due to partial overlap with channels 82-1 and 82-2, and a composite channel consisting of channels 80-4 and 80-5 is not permitted due to partial overlap with channels 82-2 and 82-3, in an embodiment. Similarly, in an embodiment, a composite channel is not permitted to partially overlap with a channel 84. For example, a composite channel consisting of component channels 80-1 through 80-5 is not permitted due to partial overlap with channels 88-1 and 88-2. As yet another example of a combination rule, in an embodiment, only certain numbers of component channels 80 may be combined to form a composite channel. While FIG. 4 illustrates an embodiment in which one, two, four, or six component channels 80 may form a composite channel, more or fewer channels may be combined.

Figure 5:
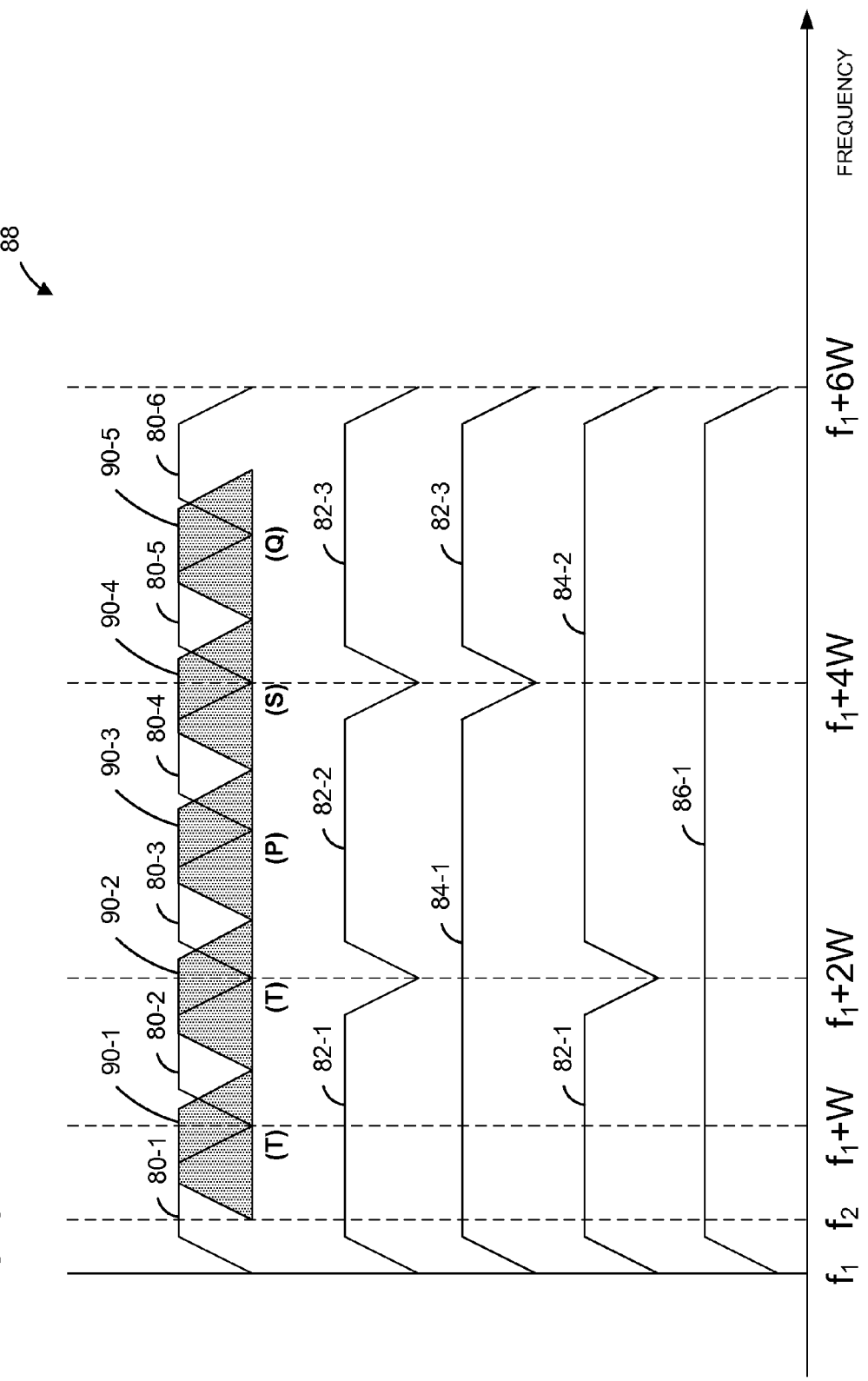
FIG. 5 is a diagram illustrating examples of channels utilized for data stream transmission and channels utilized for access control by a communication system such as the system of FIG. 1, according to an embodiment.

In addition to possible combination rules of the sort discussed above, the component channels 80 that are available to form a composite channel may be limited by the outcome of access control techniques. FIG. 5 is a diagram 88 illustrating examples of component channels 80 for communications, and access control channels 90 for controlling access to the component channels 80, that are utilized by a communication system such as the system 10 of FIG. 1, according to an embodiment. In some embodiments, the access control channels 90 are used to determine which of the component channels 80 are potentially available for use in a composite channel before any combination rules (e.g., one or more of the combination rules discussed above) are applied.

In some embodiments, a component channel 80 can only be used to form a composite channel if every access control channel 90 that overlaps the component channel 80 is idle. For example, the component channel 80-1 can only be used to form a composite channel if the access control channel 90-1 is idle. As another example, the component channel 80-2 can only be used to form a composite channel if the access control channels 90-1 and 90-2 are idle. Thus, for example, a composite channel equal to the channel 82-1 can only be formed if the access control channels 90-1 and 90-2 are idle, a composite channel equal to the channel 84-1 can only be formed if the access control channels 90-1 through 90-4 are idle, and a composite channel equal to the channel 86-1 can only be formed if the access control channels 90-1 through 90-5 are idle. Embodiments of techniques to determine whether an access control channel 90 is idle (i.e., not busy) are discussed below. In some embodiments, the access control channels 90 can themselves be utilized as communication channels for data transmissions in certain circumstances. Examples of these embodiments are discussed in more detail below in connection with FIGS. 9A, 9B and 10.

In some embodiments, each of the access control channels 90 partially overlaps at least one of the component channels 80. In some embodiments, all of the component channels 80 have a same bandwidth and/or all of the access control channels 90 have a same bandwidth. Moreover, in some embodiments, the component channels 80 have the same bandwidth as the access control channels 90. In some embodiments, at least some of the component channels 80 are adjacent to each other and/or at least some of the access control channels 90 are adjacent to each other. A combined bandwidth of all the component channels 80 if greater than a combined bandwidth of all the access control channels 90, in some embodiments. In other embodiments, a combined bandwidth of all the component channels 80 is less than a combined bandwidth of all the access control channels 90. In an embodiment, a combined bandwidth of all the component channels 80 is the same as a combined bandwidth of all the access control channels 90.

In an embodiment, the access control channels 90 used by a first communication device (e.g., the AP 14 of FIG. 1) are utilized by other communication devices (e.g., communication devices of a different BSS) as communication channels. For example, a communications device such as the AP 34 of FIG. 2 may use the access control channels 90 to form a composite channel for transmitting a data stream to another communications device (e.g., a client station 45 of FIG. 2) in a manner similar to how the AP 14 of FIG. 1 uses the component channels 80 to form a composite channel for transmitting a data stream to a client station 25 of FIG. 1. In one scenario, the component channels 80 are 20 MHz channels (i.e., W=20 MHz) in the upper end of the United States 5 GHz band allocated to IEEE 802.11 communications (i.e., 5735-5835 MHz), the access control channels 90 are 20 MHz channels in the planned Chinese 5 GHz band allocated to IEEE 802.11 communications (i.e., 5725-5850 MHz), and the frequencies f1 and f2 shown in FIG. 5 are 5727.5 MHz and 5735 MHz, respectively, for example.

In some embodiments, the access control channels 90 are each assigned a priority, such that one or more of channels 90 are primary, one or more of channels 90 are secondary, etc. For example, as illustrated in the example embodiment of FIG. 5, the channel 90-3 may be a primary channel, the channel 90-4 may be a secondary channel, the channels 90-1 and 90-2 may be tertiary channels (or may be one tertiary channel of bandwidth 2 W), and the channel 90-5 may be a quaternary channel. Other embodiments may have a different number of primary, secondary, tertiary, or quaternary access control channels, more or fewer priority levels and/or different bandwidths for different priority levels. For example, both channel 90-2 and 90-4 may be secondary channels. As another example, channel 90-1 may be a quaternary channel and channel 90-5 may be a quinary channel. In an embodiment, one of the communication devices in a network (e.g., the AP) determines which of the access control channels 90 are primary, secondary, etc., for a particular BSS.

For purposes of determining whether a component channel 80 is available to be used in forming a composite channel, an access control channel 90 having a lower priority is treated as busy (regardless of whether the channel 90 is actually busy) if an access control channel 90 having a higher priority is determined to be busy, in some embodiments. For example, the quaternary channel 90-5 may be treated as busy if at least one of the tertiary access control channels 90-1 and 90-2 is determined to be busy. Thus, in this example (and assuming the primary channel 90-3 and secondary channel 90-4 are idle), only the component channel 80-4 is available to form a composite channel, regardless of whether the quaternary channel 90-5 is actually busy.

In some embodiments no transmission is permitted unless a primary channel of the access control channels 90 is idle. For example, a composite channel may be required to include at least one component channel 80 that overlaps an idle primary channel of the access control channels 90. With reference to FIG. 5, for example, the composite channel may be required to include at least one of the component channels 80-3 and 80-4 if a transmission is to occur. Depending on which of the access control channels 90 is primary, this may require that more than one of the access control channels 90 is idle for any transmission to occur. In the example embodiment of FIG. 5, for example, at least the primary access control channel 90-3 and the secondary access control channel 90-4 must be idle in order for the component channel 80-4 to be used in forming a composite communication channel. If the primary channel in FIG. 5 were instead the access control channel 90-1, on the other hand, then a transmission could occur using a composite channel consisting of the component channel 80-1 even if the channel 90-1 were the only idle channel, in some embodiments.

FIG. 6 is a flow diagram 100 of an example method for determining and utilizing a composite communication channel formed from one or more component channels based on a determination of which channels of a set of access control channels are idle, according to an embodiment. Referring to FIG. 1, the network interface 16 (e.g., the MAC processing unit 18 and/or the PHY processing unit 20) of the AP 14 is configured to implement the method 100, in an embodiment. Additionally or alternatively, the network interface 27 (e.g., the MAC processing unit 28 and/or the PHY processing unit 29) of the client 25-1 is configured to implement the method 100, in an embodiment. The component channels and access control channels of the method 100 may correspond to the component channels 80 and access control channels 90 described above in connection with FIGS. 4 and 5, for example. Merely for illustrative purposes, FIG. 6 will be described with reference to the example channels of FIG. 5.

In the method 100, each of at least some of the component channels overlaps with at least one of the access control channels.

At block 101, capabilities, with regard to capabilities of transmitting/receiving via one or more of the component channels 80, of the device implementing the method 100 and of the communication system (e.g., a BSS) in which it operates, are determined. For example, the device implementing the method 100 may have a maximum bandwidth capability that precludes it from transmitting/receiving via all of the component channels 80. Similarly, other devices in the communication system may have maximum bandwidth capabilities that preclude the other devices from transmitting/receiving via all of the component channels 80.

At block 102, it is determined whether a primary channel is idle. The primary channel is one of the access control channels 90, in an embodiment. Embodiments of techniques to determine whether an access control channel 90 is idle (i.e., not busy) are discussed below.

At block 104, it is determined whether a secondary channel is idle. The secondary channel is one of the access control channels 90, in an embodiment. Embodiments of techniques to determine whether an access control channel 90 is idle (i.e., not busy) are discussed below. The secondary channel is adjacent to the primary channel in an embodiment.

At block 106, it is determined whether a tertiary channel is idle. The tertiary channel is one of the access control channels 90, in an embodiment. Embodiments of techniques to determine whether an access control channel 90 is idle (i.e., not busy) are discussed below. The tertiary channel is adjacent to the primary channel or the secondary channel, in an embodiment.

At block 108, it is determined whether a quaternary channel is idle. The quaternary channel is one of the access control channels 90, in an embodiment. Embodiments of techniques to determine whether an access control channel 90 is idle (i.e., not busy) are discussed below. The quaternary channel is adjacent to the primary channel, the secondary channel, or the tertiary channel, in an embodiment.

At block 110, a composite channel is formed from a set of one or more component channels based on the determinations performed at blocks 101, 102, 104, 106, and 108. The one or more component channels are one or more of the component channels 80, in an embodiment. In general, the composite channel is formed using component channels that are not overlapped by access control channels that are determined to be busy (i.e., not idle) at blocks 102, 104, 106, and 108, provided that the device implementing the method 100 and other devices in the communication system are capable of transmitting/receiving via all of those component channels, and subject to any combination rules. For example, if it is determined that the primary and secondary channels are idle, but that the tertiary and quaternary channels are not idle (i.e., busy), the composite channel is formed to consist of the component channels that are not overlapped by the tertiary or quaternary channels, subject to any combination rules. As another example, if it is determined that the primary, secondary, and tertiary channels are idle, but that the quaternary channel is busy, the composite channel is formed to consist of the component channels that are not overlapped by the quaternary channel, subject to any combination rules.

At block 112, the composite channel determined at block 110 is utilized to transmit information. For example, referring to FIG. 1, the AP 14 transmits information to one or more of the clients 25-1, 25-2, and 25-3 using the composite channel, in an embodiment. As another example, the client 25-1 transmits information to the AP 14 using the composite channel, in an embodiment. The transmitted information includes one or more data units such as the data unit 50 of FIG. 3, in an embodiment.

Some or all of blocks 104, 106, and 108 are skipped based on the determination made at block 101, in some embodiments. For example, if it is determined at block 101 that the device implementing the method 100 and/or other devices in the communication system are not capable of transmitting/receiving via a composite channel that includes any component channels overlapped by the quaternary channel, then block 108 is skipped and block 110 does not utilize a determination at block 108, in an embodiment. Further, some or all of blocks 104, 106, and 108 may be skipped if it was determined at an earlier block that a higher priority channel is busy. For example, if it is determined at block 104 that the secondary channel is busy, then blocks 106 and 108 are skipped and block 110 does not utilize a determination at block 106 and a determination at block 108, in an embodiment. In some embodiments, if at block 102 it is determined that the primary channel is busy, none of the other blocks are performed. For example, if the primary channel is determined to be busy at block 102, it may be determined that no transmission should occur at the present time, in an embodiment. For example, a network interface such as the network interface 16 (or the network interface 27) of FIG. 1 may wait for a period of time (e.g., at least a "back-off" time period) before performing the flow 100 again.

As discussed above, in other embodiments there are more or fewer priority levels than primary, secondary, tertiary, and quaternary, and/or more than one access control channel corresponding to each priority level. For example, at block 106 it may be determined whether a first tertiary channel is idle, and at an additional block (not shown) it may be determined whether a second tertiary channel is idle.

Embodiments of techniques to determine whether an access control channel is idle (i.e., not busy) will now be described. Merely for illustrative purposes, the techniques will be described with reference to FIG. 1, with the AP 14 determining which of the access control channels are idle before transmitting a data stream to a client station 25-1 using the component channels. In some embodiments, however, the client station 25-1 or another communication device may similarly determine whether an access control channel is idle (e.g., before transmitting a data stream to the AP 14). In an embodiment, the AP 14 may determine whether an access control channel is idle by determining whether the channel is idle from a standpoint of the AP 14 and/or by determining whether the channel is idle from a standpoint of the client station 25-1.

In some embodiments, the AP 14 determines whether an access control channel is idle from a standpoint of the AP 14 by using a clear channel assessment (CCA) technique in the channel. For example, the AP 14 measures a signal level on the channel using a suitable signal measurement technique, in an embodiment. For instance, the AP 14 may measure an energy level in the channel. As another example of a CCA technique, the AP 14 determines whether there is a valid signal on the channel, in an embodiment. For instance, the AP 14 may determine whether there is a signal on the channel that conforms to the VHT communication protocol or a legacy communication protocol. In some embodiments, the AP 14 both measures a signal level on the channel and determines whether there is a valid signal on the channel.

In some embodiments, the AP 14 determines whether the access control channel is idle from the standpoint of the AP 14 based on the signal level measured in the channels. In an embodiment, the AP 14 determines whether the access control channel is idle from the standpoint of the AP 14 by comparing the measured signal level to a first threshold. For example, when the signal level measurement meets (e.g., exceeds) the first threshold, it is determined that the channel is not idle (i.e., is busy). In an embodiment, the first threshold is based on a minimum modulation and coding rate sensitivity defined by the legacy communication protocol and/or the VHT communication protocol.

In some embodiments, when the AP 14 determines that there is a valid signal on the access control channel, the AP 14 also compares the measured signal level to a second threshold. For example, when there is a valid signal on the channel and when the signal level measurement meets (e.g., exceeds) the second threshold, it is determined that the channel is busy. In an embodiment, the second threshold is lower than or equal to the first threshold. In an embodiment, the second threshold is set so that a start of a valid signal on the channel, at a received signal level equal to or greater than a minimum modulation and coding rate sensitivity of the legacy communication protocol and/or the VHT communication protocol at a defined signal level, results in detecting that the primary channel is busy with a defined probability within a defined amount of time.

In some scenarios, i) comparing a signal level measurement to the first threshold and ii) comparing a signal level measurement to the second threshold are not both performed. For example, if no valid signal is detected on the access control channel, comparing a signal level measurement to the second threshold is not performed, in an embodiment. As another example, if comparing a signal level measurement to the first threshold results in determining that the channel is busy, comparing a signal level measurement to the second threshold is not performed, in an embodiment. Similarly, as another example, if comparing a signal level measurement to the second threshold results in determining that the channel is busy, comparing a signal level measurement to the first threshold is not performed, in an embodiment.

A CCA technique such as one of the CCA techniques discussed above is used in each of the access control channels, in an embodiment. For example, the AP 14 may make a first signal level measurement and determine whether there is a first valid signal on a primary access control channel, make a second signal level measurement and determine whether there is a second valid signal on a secondary access control channel, etc. Example techniques for determining whether communication channels are idle from a standpoint of a first communication device are described in more detail in U.S. patent application Ser. No. 13/034,409 (filed Feb. 24, 2011), which is hereby incorporated by reference herein in its entirety.

In some embodiments, the AP 14 additionally or alternatively determines whether an access control channel is busy from a standpoint of the client station 25-1. In an embodiment, the AP 14 determines this by transmitting a control frame to the client station 25-1 on the access control channel and receiving a response frame from the client station 25-1 on the access control channel. The control frame is a request-to-send (RTS) frame and the response frame is a clear-to-send (CTS) frame, in an embodiment.

In some embodiments, the control frame may include a preamble, which may include data such as the L-STF, L-LTF and L-SIG discussed above, for example. In some embodiments, the preamble of the control frame also includes information indicating the bandwidth of the control frame. For example, the preamble may include information indicating the bandwidth that the AP 14 utilized to transmit the RTS. In some embodiments, the client station 25-1 learns the composite channel bandwidth from the control frame. In other embodiments, the client station 25-1 learns the composite channel bandwidth by determining the channels on which a control frame is received from the AP 14. The response frame transmitted by the client station 25-1 to the AP 14 may include information indicating the bandwidth (or a set of bandwidths) at which the client station 25-1 is able and/or willing to receive data. For example, an indication of the bandwidth at which the client station 25-1 is able and/or willing to receive data is included in a preamble of a CTS. In some embodiments, the preamble of the control frame (e.g., RTS) includes information indicating the time duration of an intended upcoming transmission by the AP 14. In response to receiving the control frame with the preamble, the client station 25-1 updates an NAV, in an embodiment. In some embodiments, the client station 25-1 monitors (e.g., continuously or periodically) the access control channels 90 for control frames unless the station 25-1 has already completed an RTS-CTS exchange with the AP 14 and the station 25-1 is receiving or waiting to receive a transmission or transmission sequence from the AP 14.

In some embodiments, the AP 14 duplicates at least a portion of the control frame in each access control channel that the AP 14 had determined to be idle from the standpoint of the AP 14 (e.g., each channel determined to be idle using a CCA technique). For example, in an embodiment in which the AP 14 uses a CCA method to determine that a primary and secondary access control channel are idle from the standpoint of the AP 14, at least a portion of the control frame is duplicated in each of the primary and secondary channels, in an embodiment. The control frame (e.g., an RTS frame) and/or the response frame (e.g., a CTS frame) are transmitted in non-HT duplicate mode, in an embodiment.

When receiving a control frame from the AP 14 on an access control channel, the client station 25-1 in some embodiments determines whether the channel has been idle from a standpoint of the client station 25-1 for a particular time period preceding the time that the control frame was received. For example, prior to reception of the control frame, the client station 25-1 may use CCA techniques similar to those discussed above to determine whether the channel is idle from the standpoint of the client station 25-1. In an embodiment, the client station 25-1 determines whether a channel has been idle for the requisite time period for each channel on which the client station 25-1 received a control frame from the AP 14. In some embodiments, the time period is different for different channels (e.g., the time period may be longer for a primary channel). For each of those channels that the client station 25-1 determines to be idle, the client station 25-1 transmits a response frame (e.g., a CTS frame) to the AP 14 on the channel, in an embodiment. For each of those channels that the client station 25-1 determines to be busy, and for channels on which the client station 25-1 did not receive a control frame, the client station 25-1 does not transmit a response frame to the AP 14 on the channel, in an embodiment. Example techniques for determining whether communication channels are idle from a standpoint of a second communication device are described in more detail in U.S. patent application Ser. No. 13/152,040 (filed Jun. 6, 2011), which is hereby incorporated by reference herein in its entirety. The CTS frame may include in the preamble an indication of the channels on which the CTS frame is transmitted. This indicates to the AP 14 which channels are idle/useable from the standpoint of the client station 25-1, in an embodiment.

FIGS. 7A-7C are diagrams of example transmissions in a communication system utilizing a composite channel based on a determination of which channels of a set of access control channels are idle, according to an embodiment. The component channels 80 and access control channels 90 of FIGS. 7A-7C may correspond to the component channels 80 and access control channels 90 in FIG. 5, for example. The composite channel transmissions in FIGS. 7A-7C may be generated and transmitted by an AP such as the AP 14 (FIG. 1), or a client station, such as the client station 25-1 (FIG. 1), for example. Merely for illustrative purposes, FIGS. 7A-7C will be described with reference to the example embodiment of FIG. 1, with the composite channel transmission being transmitted by the AP 14 to the client station 25-1. In some embodiments, however, the client station 25-1 or another communication device may similarly transmit the composite channel transmissions of FIGS. 7A-7C. (e.g., when transmitting a data stream to the AP 14).

In the example scenario illustrated in the diagram 150 of FIG. 7A, all of the access control channels 90 are determined by the AP 14 to be idle. Prior to the composite channel transmission 154, the AP 14 determines whether each of the access control channels 90 is idle from the standpoint of the AP 14 and from the standpoint of the client station 25-1, in an embodiment. In an embodiment, the AP 14 first determines whether each of the access control channels 90 is idle from the standpoint of the AP 14 by using a CCA technique (e.g., a CCA technique discussed above), for example. In some embodiments, the AP 14 determines whether each of the access control channels 90 is idle from the standpoint of the AP 14 (e.g., measures signal levels and/or determines whether there is a valid signal) for at least a particular period of time. In some embodiments, the period of time varies depending on the type of channel. For example, referring to the example embodiment of FIG. 7A, it is determined whether the primary channel 90-3 is idle from the standpoint of the AP 14 at least for a time period 156, whereas it is determined whether the secondary channel 90-4, the tertiary channels 90-1 and 90-2, and/or the quaternary channel 90-5 are idle from the standpoint of the AP 14 at least for a time period 158, which is different than the time period 156. In an embodiment, the time period 158 is shorter than the time period 156, at least on average. In the example embodiment illustrated in FIG. 7A, the primary channel 90-3 is idle for at least the time period 156. Additionally, the secondary channel, the tertiary channel, and the quaternary channel each are idle for at least for the time period 158. Thus, the composite channel is determined not to exclude the component channels 80 overlapped by any of the primary channel 90-3, the secondary channel 90-4, the tertiary channels 90-1 and 90-2, and the quaternary channel 90-5 (i.e., the composite channel includes all of the component channels 80).

In some embodiments and/or scenarios, the time period 158 is a suitable defined and/or determined time period such as the arbitration interframe space (AIFS), the point coordination function (PCF) interframe space (PIFS), or the distributed coordination function (DCF) interframe space (DIFS) described in the IEEE 802.11 Standard. In some embodiments and/or scenarios, the time period 156 is a suitable time period determined based on the time period 158. For example, in an embodiment, the time period 156 is determined as a sum of the time period 158 with a suitable additional time period such as a back-off time period. In an embodiment, the back-off time period is a randomly generated time period such as described in the IEEE 802.11 Standard. As used herein, the term "randomly generated time period" encompasses pseudo-randomly generated time periods.

In an embodiment, the AP 14 next determines whether each of the access control channels 90 determined to be idle from the standpoint of the AP 14 is also idle from the standpoint of the client station 25-1. In the example embodiment illustrated in FIG. 7A, it is determined that each of the access control channels 90 is idle from the standpoint of the client station 25-1 by transmitting to the station 25-1 an RTS frame 160 on each of the access control channels 90 and receiving in response from the station 25-1 a CTS frame 162 on each of the channels 90. The RTS frame and the RTS-CTS sequence may be similar to that described above, for example. If an access control channel 90 is determined to be idle both from the standpoint of the AP 14 and from the standpoint of the client station 25-1, that channel 90 is determined to be idle, in an embodiment. Conversely, if an access control channel 90 is determined to be busy either from the standpoint of the AP 14 or from the standpoint of the client station 25-1 (or both, in some embodiments), that channel 90 is determined to be busy, and the composite channel to be used for the composite channel transmission 154 cannot use any component channel 80 that is overlapped by that access control channel 90, in an embodiment.

Because none of the component channels 80 is overlapped by a busy access control channel 90 in the example embodiment illustrated in FIG. 7A, all of the component channels 80 are used to form the composite channel for the composite channel transmission 154, according to an embodiment. The composite channel corresponds to the channel 86-1 of FIG. 5, for example. The AP 14 transmits the composite channel transmission 154 to the client station 25-1 via the composite channel. The composite channel transmission 154 is a single data unit (e.g., the data unit 50 of FIG. 3), in some embodiments. When the client station 25-1 receives the transmission 154, it sends an acknowledgement (ACK) 164 (e.g., an ACK frame) back to the AP 14 on each of the access control channels 90 that overlaps a component channel 80 of the composite channel (i.e., channels 90-1 through 90-5), in an embodiment. In some embodiments, the AP 14 may proceed to transmit one or more additional data frames (e.g., similar to the first composite channel transmission 154) on the composite channel after receiving an ACK 164 without having to first determine whether any of the access control channels 90 are still idle. The ACK 164 is transmitted in non-HT duplicate mode, in an embodiment. In another embodiment, the ACK 164 is transmitted on the composite channel.

In the example scenario illustrated in diagram 170 of FIG. 7B, all of the access control channels 90 are determined to be idle except for the quaternary channel 90-5, which is determined to be busy. The channel 90-5 may be determined to be busy based on the result of a CCA technique applied during the time period 158, for example, such as a CCA technique discussed above. As another example, the channel 90-5 may be determined to be busy based on a failure to receive a CTS frame such as the CTS frame 162 on the channel 90-5 after transmitting an RTS frame such as the RTS frame 160 on the channel 90-5.

Because the busy access control channel 90-5 overlaps the component channels 80-5 and 80-6 in the example illustrated in FIG. 7B, neither of channels 80-5 and 80-6 is available for use in forming a composite channel, according to an embodiment. Accordingly, the composite channel is formed using component channels 80-1 through 80-4. The composite channel corresponds to the channel 84-1 of FIG. 5, for example. The AP 14 transmits the composite channel transmission 154 to the client station 25-1 via the composite channel. The composite channel transmission 154 is a single data unit (e.g., the data unit 50 of FIG. 3), in some embodiments. When the client station 25-1 receives the transmission 154, it sends an ACK 164 back to the AP 14 on each of the access control channels 90 that overlaps a component channel 80 of the composite channel (i.e., channels 90-1 through 90-4), in an embodiment. In another embodiment, the ACK 164 is transmitted on the composite channel. In some embodiments, the AP 14 may then proceed to transmit one or more additional data frames (e.g., similar to the first composite channel transmission 154) on the composite channel without having to first determine whether any of the access control channels 90 are still idle.

In the example scenario illustrated in diagram 174 of FIG. 7C, the primary access control channel 90-3 and the secondary access control channel 90-4 are determined to be idle and the tertiary access control channels 90-1 and 90-2 and quaternary access control channel 90-5 are determined to be busy. The channels 90-1, 90-2, and 90-5 may be determined to be busy based on the result of a CCA technique applied during the time period 158, for example, such as a CCA technique discussed above. As another example, the channels 90-1, 90-2, and 90-5 may be determined to be busy based on a failure to receive a CTS frame such as the CTS frame 162 on the channels after transmitting an RTS frame such as the RTS frame 160 on each of the channels. As yet another example, in some embodiments, the quaternary channel 90-5 is not busy from the standpoint of the AP 14 or client station 25, but is treated as busy (for purposes of determining which component channels 80 are available) based on a determination that the tertiary channel 90-1 and/or the tertiary channel 90-2 was busy. In some embodiments, some of the channels 90-1, 90-2, and 90-5 are determined based on the result of a CCA technique and some are determined to be busy based on a failure to receive a CTS frame.

Because the busy access control channels 90-1, 90-2, and 90-5 overlap the component channels 80-1 through 80-3, 80-5, and 80-6 in the example illustrated in FIG. 7C, none of the channels 80-1 through 80-3, 80-5, and 80-6 is available for use in forming a composite channel, according to an embodiment. Accordingly, the composite channel is formed using only component channel 80-4. The AP 14 transmits the composite channel transmission 154 to the client station 25-1 via the composite channel. The composite channel transmission 154 is a single data unit (e.g., the data unit 50 of FIG. 3), in some embodiments. When the client station 25-1 receives the transmission 154, it sends an ACK 164 back to the AP 14 on each of the access control channels 90 that overlaps a component channel 80 of the composite channel (i.e., channels 90-3 and 90-4), in an embodiment. In another embodiment, the ACK 164 is transmitted on the composite channel (i.e., channel 80-4). In some embodiments, the AP 14 may then proceed to transmit one or more additional data frames (e.g., similar to the first composite channel transmission 154) on the composite channel without having to first determine whether any of the access control channels 90 are still idle.

Figure 8B:
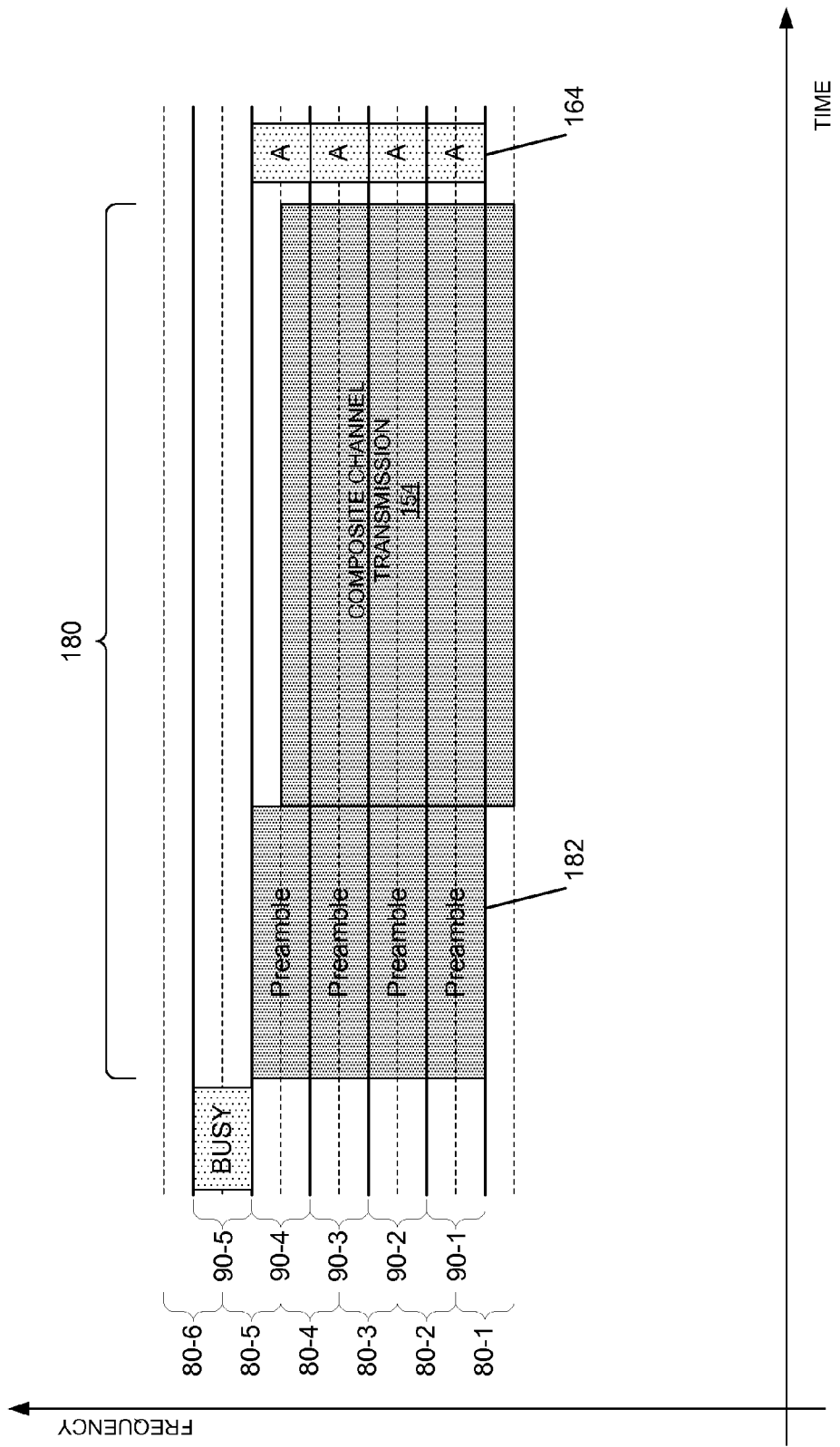
FIG. 8B is a diagram of another example transmission in a communication system utilizing a composite channel having a preamble in the access control channels, according to an embodiment.

In some embodiments, the composite channel transmission 154 of FIGS. 7A-7C, transmitted on one or more of the component channels 80, is a part of a single data unit that also includes a preamble portion transmitted on the one or more component channels 80. In other embodiments, however, the composite channel transmission 154 of FIGS. 7A-7C, transmitted on one or more of the component channels 80, is a part of a single data unit that also includes a preamble portion transmitted on one or more of the access control channels 90. In these embodiments, the bandwidth of the data unit transmission changes after the transmission of the data unit begins and before the transmission of the data unit ends. In these embodiments, the preamble portion on the access control channels 90 is only transmitted on access control channels 90 that are determined to be idle (e.g., using techniques discussed above), in some embodiments. FIGS. 8A and 8B illustrate examples of a data unit 180 according to these embodiments.

In the example scenario illustrated in FIG. 8A, each of the access control channels 90 is determined to be idle, and therefore the composite channel for the transmission 154 includes all of the component channels 80. A preamble portion 182 is duplicated in whole or in part on each of the access control channels 90 that overlaps the composite channel (i.e., channels 90-1 through 90-5), in an embodiment. Each of the preambles 182 includes at least L-STF, L-LTF, L-SIG, and VHT-SIGA fields (e.g., similar to the fields 52, 54, 56, and 58, respectively, in FIG. 2), in an embodiment. The transmission 154 (i.e., the portion of the data unit 180 transmitted on the composite channel formed from the component channels 80) may include a second preamble with training and/or signal fields, in addition to a data portion (e.g., the data portion 72 of FIG. 3), in an embodiment. In an embodiment, the transmission 154 on one or more of the component channels 80 includes at least the VHT-STF, VHT-LTF, and VHT-SIGB fields, in addition to a data portion. In some embodiments, the training and/or signal fields of the transmission 154 portion of the data unit 180 are duplicated in whole or in part on each of the component channels 80 included in the composite channel utilized for the transmission 154.

In the example scenario illustrated in FIG. 8B, each of the access control channels 90 is determined to be idle except for the access control channel 90-5, which is determined to be busy. Therefore, the composite channel for the transmission 154 includes the component channels 80-1 through 80-4, in an embodiment. A preamble portion 182 is duplicated in whole or in part on each of the access control channels 90 that overlaps the composite channel (i.e., channels 90-1 through 90-4), in an embodiment. The preamble 182 and the transmission 154 may otherwise be similar to the preamble 182 and the transmission 154 of FIG. 8A, for example.

Figure 9A:
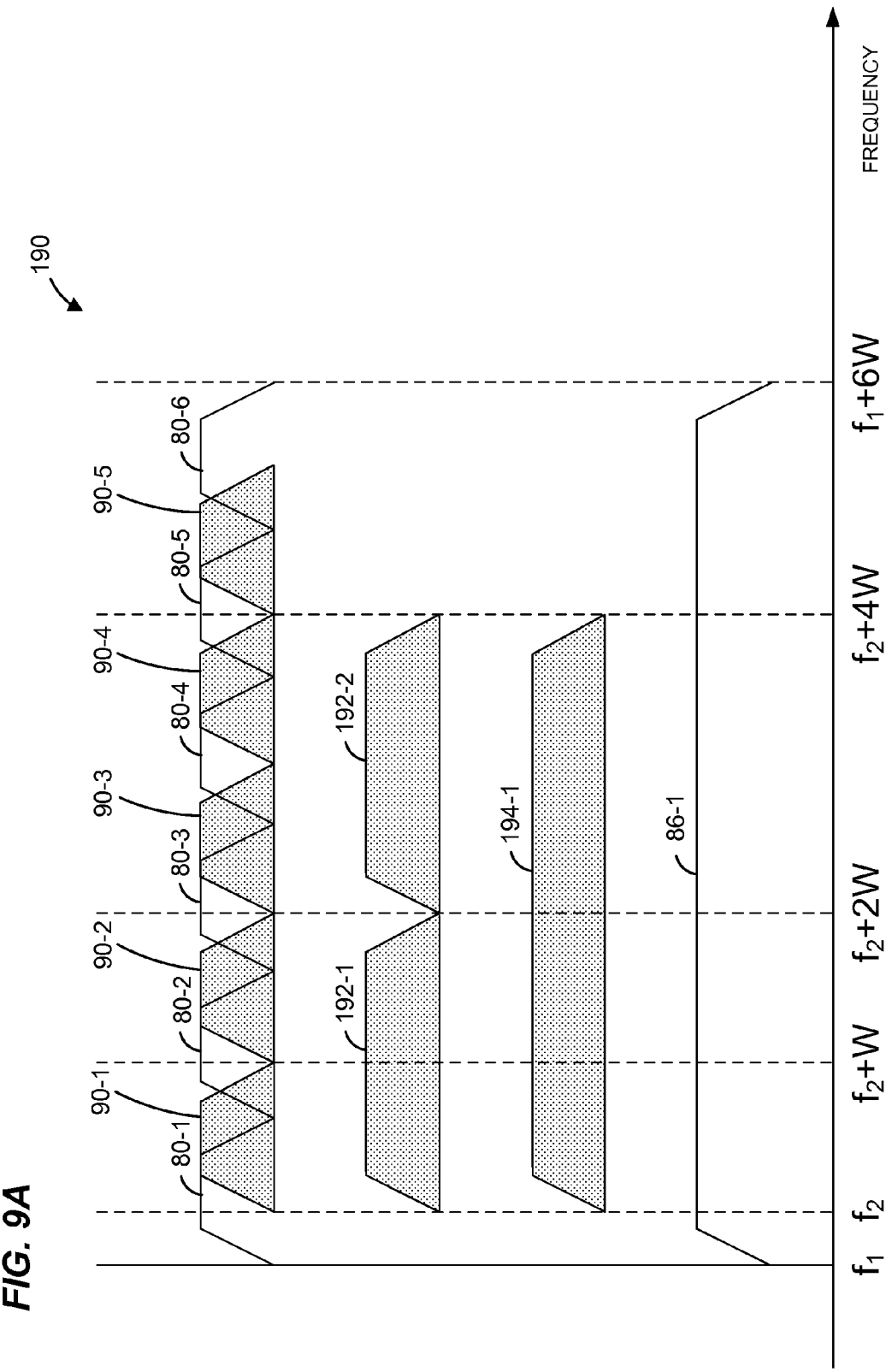
FIG. 9A is a diagram illustrating examples of channels utilized for data stream transmission and/or access control by a communication system such as the system of FIG. 1, according to an embodiment.

In some embodiments, some or all of the channels used for controlling access to the composite communication channels can also be utilized as additional communication channels in some scenarios. FIGS. 9A and 9B illustrate examples of component channels used for transmitting data streams and access control channels used for access control as well as transmitting data streams.

FIG. 9A is a diagram 190 illustrating examples of channels utilized for data stream transmission and/or access control by a communication system such as the system 10 of FIG. 1, according to an embodiment. The component channels 80 and access control channels 90 may differ in number and/or bandwidth from the example embodiment illustrated in FIG. 9A, as discussed above in connection with the component channels 80 and access control channels 90 of FIGS. 4 and 5. The frequencies $f_1$ and $f_2$ may be suitable frequencies, and the bandwidth W may be a suitable bandwidth, as discussed above in connection with FIG. 4.

As discussed above in connection with FIG. 5, a composite communication channel can be the channel 86-1 when all of the component channels 80 are available (e.g., when all of the access control channels 90-1 through 90-5 are idle). In contrast to the embodiments described above in connection with FIG. 5, however, the example embodiment shown in FIG. 9A also permits a composite communication channel to be formed using at least one of the access control channels 90. In some embodiments, a composite channel formed using the access control channels 90 is subject to combination rules similar to those discussed above in connection with composite channels formed using the component channels 80. In an embodiment, for example, non-contiguous composite channels formed from one or more of the access control channels 90 are not permitted. For example, a composite channel that combines only access control channels 90-2 and 90-4 may not be permitted. As another example of a combination rule, in an embodiment and for a given set of access control channels 90, a composite channel formed from the access control channels 90 is not permitted to partially overlap with a channel 192. For example, a composite channel consisting of channels 90-2 and 90-3 is not permitted due to partial overlap with channels 192-1 and 192-2, and a composite channel consisting of channels 90-4 and 90-5 is not permitted due to partial overlap with channel 192-2, in an embodiment. Similarly, in an embodiment, a composite channel formed from the access control channels 90 is not permitted to partially overlap with the channel 194-1. For example, a composite channel consisting of the access control channels 90-1 through 90-5 is not permitted due to partial overlap with channel 194-1. As yet another example of a combination rule, in an embodiment, only certain numbers of access control channels 90 may be combined to form a composite channel. While FIG. 9A illustrates an embodiment in which one, two, or four access control channels 90 may form a composite channel, more or fewer channels may be combined in other embodiments.

In some embodiments, only an access control channel 90 that is idle can be used to form a composite channel. For example, the access control channel 90-1 can only be used to form a composite channel if the channel 90-1 is idle. As further examples, a composite channel equal to the channel 192-1 can only be formed if the access control channels 90-1 and 90-2 are idle, and a composite channel equal to the channel 194-1 can only be formed if the access control channels 90-1 through 90-4 are idle. The access control channels 90 may be determined to be idle or not idle (i.e., busy) using techniques such as those discussed above (e.g., CCA techniques for determining whether each of the channels 90 is idle from a standpoint of a transmitting device, and/or control/ response frame techniques for determining whether each of the channels 90 is idle from a standpoint of a receiving device).

In some embodiments, the access control channels 90 are arranged according to a priority scheme similar to that discussed above in connection with the access control channels 90 of FIG. 5. For example, as illustrated in the example embodiment of FIG. 9A, the channel 90-3 may be a primary channel, the channel 90-4 may be a secondary channel, the channels 90-1 and 90-2 may be tertiary channels, and the channel 90-5 may be a quaternary channel. Other embodiments have a different number of primary, secondary, tertiary, or quaternary access control channels, and/or have more or fewer priority levels. For example, both channel 90-2 and 90-4 may be secondary channels. As another example, there may be no quaternary channels (e.g., channel 90-5 may be an additional tertiary channel).

In some embodiments, a composite communication channel is formed using the access control channels 90 if less than all of the access control channels 90 are idle, and is formed using the component channels 80 if all of the access control channels 90 are idle. For example, the composite channel may be the channel 192-1, 192-2, or 194-1 (i.e., an aggregate of the access control channels 90-1 and 90-2, 90-3 and 90-4, or 90-1 through 90-4, respectively) if less than all of the access control channels 90 are idle, and may instead be the channel 86-1 (i.e., an aggregate of all of the component channels 80) if all of the access control channels 90 are idle. The example channels illustrated in FIG. 9A reflect this example embodiment if it is understood that a composite channel of bandwidth W can only be formed from an access control channel 90, and not from a component channel 80 depicted in FIG. 9A.

In some embodiments, a composite communication channel is formed using the access control channels 90 if a permissible composite channel having a threshold bandwidth cannot be formed using the component channels 80 (e.g., due to certain of the component channels 80 being overlapped by access control channels 90 that are busy), and is formed using the component channels 80 if a permissible composite channel having the threshold bandwidth can be formed using the component channels 80 (e.g., due to certain component channels 80 not being overlapped by access control channels 90 that are busy). For example, the composite channel may be one of the channels 192-1 and 192-2 if no permissible composite channel having a bandwidth greater than or equal to 4 W can be formed using any of the component channels 80, and may instead be a channel formed from four or more of the component channels 80 (e.g., the channel 86-1) if those four or more component channels 80 are available (e.g., are not overlapped by an access control channel 90 that is busy). The example channels illustrated in FIG. 9A also reflect this embodiment, in a scenario in which the threshold bandwidth is set to 6 W (again, if it is understood that a composite channel of bandwidth W can only be formed from an access control channel 90, and not from a component channel 80 depicted in FIG. 9A).

FIG. 9B is a diagram 196 illustrating further examples of channels utilized for data stream transmission and/or access control by a communication system such as the system 10 of FIG. 1, according to an embodiment. The example embodiment shown in the diagram 196 is similar to the example embodiment shown in the diagram 190 of FIG. 9A, except that a composite channel may also be formed using either the component channels 80-5 and 80-6 (i.e., the composite channel equals the channel 82-3) or the component channels 80-3 through 80-6 (i.e., the composite channel equals the channel 84-2). In some embodiments, a composite channel is not permitted to include a particular subset of the component channels 80 if the composite channel does not have at least a first threshold bandwidth. For example, as reflected in the example channels of FIG. 9B, a composite channel is not permitted to include any of the component channels 80 in a subset consisting of the component channels 80-1 through 80-4 if the composite channel does not have a bandwidth of 4 W or greater, in an embodiment. The example channels illustrated in FIG. 9A (discussed above) further reflect an example embodiment in which a composite channel is not permitted to include any of the component channels 80 in a subset consisting of the component channels 80-1 through 80-6 (i.e., all component channels 80) if the channel does not have a bandwidth of 6 W.

In some embodiments, a composite channel is additionally not permitted to include a second subset of the component channels 80 if the composite channel does not have at least a second threshold bandwidth. For example, as reflected in the example embodiment of FIG. 9B, a composite channel is additionally not permitted to include any of the component channels 80 in a subset consisting of the component channels 80-1 and 80-2 if the composite channel does not have a bandwidth of 6 W or greater, in an embodiment. Additional subsets and corresponding additional threshold bandwidths may be defined, in some embodiments. In some embodiments, one or more subsets consist of a single channel of the component channels 80.

In some embodiments, a composite channel is not permitted to be coextensive with a particular subset of the component channels 80. For example, as reflected in the example channels of FIG. 9B, a composite channel is not be permitted to be coextensive with the component channels 80-1 through 80-4, in an embodiment. In some embodiments, a composite channel is additionally not permitted to be coextensive with additional subsets of the component channels 80. For example, as reflected in the example channels of FIG. 9B, a composite channel may additionally not be permitted to be coextensive with a second subset consisting of the component channels 80-1 and 80-2, and not be permitted to be coextensive with a third subset consisting of the component channels 80-3 and 80-4. In some embodiments, one or more of the subsets are single channels of the component channels 80.

In scenarios where a composite channel is not permitted to include or consist of certain subsets of the component channels 80 due to restrictions such as those discussed above, any composite channel must be formed using either one or more of the remaining, permitted component channels 80, or a group of one or more of the access control channels 90, subject to any combination rules and/or priorities as discussed above. In some embodiments, the composite channel is formed to have the largest possible bandwidth, subject to limitations due to combination rules, priorities, and/or subset restrictions as discussed above.

Figure 10:
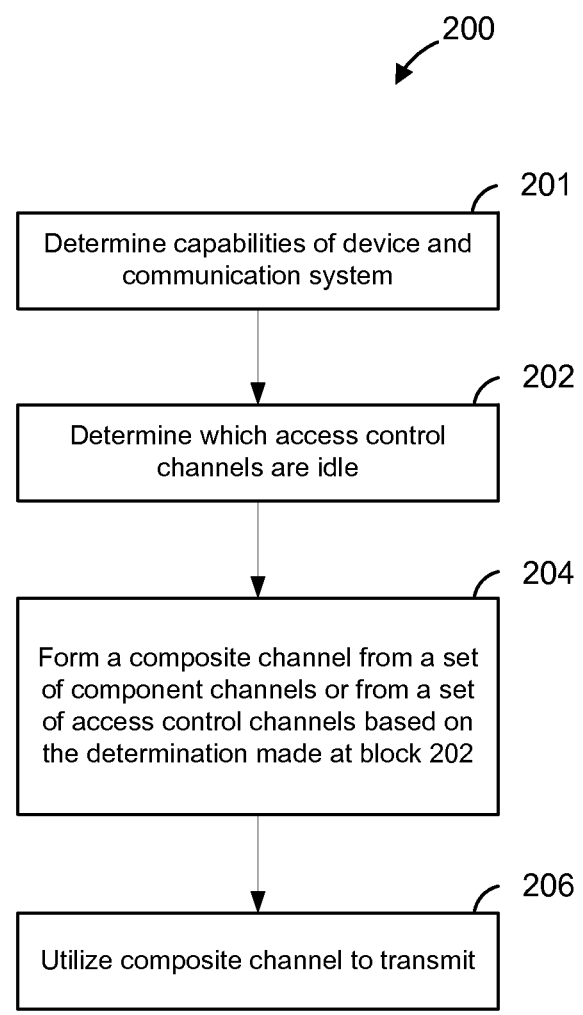
FIG. 10 is a flow diagram of an example method for determining and utilizing a composite communication channel formed either from one or more component channels or from one or more access control channels based on a determination of which access control channels are idle, according to an embodiment.

FIG. 10 is a flow diagram 200 of an example method for determining and utilizing a composite channel formed either from one or more component channels or from one or more access control channels based on a determination of which access control channels are idle, according to an embodiment. Referring to FIG. 1, the network interface 16 (e.g., the MAC processing unit 18 and/or the PHY processing unit 20) of the AP 14 is configured to implement the method 200, in an embodiment. Additionally or alternatively, the network interface 27 (e.g., the MAC processing unit 28 and/or the PHY processing unit 29) of the client 25-1 is configured to implement the method 200, in an embodiment. The component channels and access control channels of the method 200 may correspond to the component channels 80 and access control channels 90 described above in connection with FIGS. 9A and 9B, for example. In some embodiments, the access control channels 90 are assigned priorities (e.g., primary, secondary, etc.) as discussed above in connection with FIGS. 9A and 9B. Merely for illustrative purposes, FIG. 10 will be described with reference to the example channels of FIGS. 9A and 9B.

At block 201, capabilities, with regard to capabilities of transmitting/receiving via one or more of the component channels 80 and/or one or more of the access control channels 90, of the device implementing the method 200 and of the communication system (e.g., a BSS) in which it operates, are determined. For example, the device implementing the method 200 may have a maximum bandwidth capability that precludes it from transmitting/receiving via all of the component channels 80 and/or all of the access component channels 90. Similarly, other devices in the communication system may have maximum bandwidth capabilities that preclude the other devices from transmitting/receiving via all of the component channels 80 and/or all of the access component channels 90.

At block 202, it is determined which of the access control channels 90 are idle. Embodiments of techniques to determine whether each of the access control channels 90 is idle (i.e., not busy) are discussed above. In some embodiments, determining which access control channels 90 are idle at block 202 does not require determining whether every channel of the access control channels 90 is idle. For example, a first access control channel having a first priority is treated as busy (for purposes of forming a composite channel at block 204) regardless of whether the channel is actually busy if a second access control channel having a second, higher priority is determined to be busy, in some embodiments. For example, the quaternary channel 90-5 may be treated as busy if at least one of the tertiary access control channels 90-1 and 90-2 is determined to be busy.

At block 204, a composite channel is formed from a set of one or more component channels or from a set of one or more access control channels based on the determinations performed at blocks 201, 202, 204, and 206. The one or more component channels are one or more of the component channels 80 and the one or more access control channels are one or more of the access channels 90, in an embodiment. In some embodiments, a composite channel that is formed by aggregating one or more of the component channels 80 is not permitted to be formed by aggregating any of the access control channels 90, and vice versa. Generally, an access control channel 90 is available if that channel 90 is determined to be idle, and a component channel 80 is available if that channel 80 is not overlapped by an access control channel 90 that is determined to be busy (or by a channel 90 that is treated as busy based on priority rules). The composite channel is formed from either the available component channels 80 or the available access control channels 90 to form the largest possible bandwidth, subject to any combination rules (e.g., the combination rules for the component channels 80 and access control channels 90 discussed above in connection with FIGS. 4 and 9A) and subset restrictions (e.g., the subset restrictions on the component channels 80 discussed above in connection with FIGS. 9A and 9B), in an embodiment.

At block 206, the composite channel determined at block 204 is utilized to transmit information. For example, referring to FIG. 1, the AP 14 transmits information to one or more of the clients 25-1, 25-2, and 25-3 using the composite channel, in an embodiment. As another example, the client 25-1 transmits information to the AP 14 using the composite channel, in an embodiment.

One or both of blocks 204 and 206 is skipped based on the determination made at block 202, in some embodiments. For example, if it is determined at block 202 that a primary channel of the access control channels 90 is busy, none of the other blocks are performed, in an embodiment. For example, if a primary channel is determined to be busy at block 202, it may be determined that no transmission should occur at the present time, in an embodiment. For example, a network interface such as the network interface 16 (or the network interface 27) of FIG. 1 may wait for a period of time (e.g., at least a "back-off" time period) before performing the flow 200 again.

In embodiments described below, a communication system such as the WLAN 10 of FIG. 1 is capable of utilizing at least two sets of communication channels. A device such as an AP (e.g., the AP 14 of FIG. 1) scans for existing BSSs on at least a first set of communication channels and a second set of communication channels, and based on the outcome of the scan selects which set of communication channels is utilized for a BSS (e.g., a BSS including the AP 14 and client stations 25 of the WLAN 10 of FIG. 1), in an embodiment. One or more channels of the first set of communication channels may overlap with one or more channels of the second set of communication channels, in an embodiment.

In some embodiments, the AP is required to select a particular set of communication channels for a BSS of the AP if another, coexisting BSS is detected on that set of channels. For example, the AP is required to select the second set of communication channels for the BSS of the AP if the AP detects another BSS that uses the second set of communication channels, in an embodiment. In some embodiments, the AP may choose between at least two sets of communication channels for the BSS of the AP if no BSS is detected on a particular one of the sets of communication channels. For example, the AP may select between a first and a second set of communication channels for a BSS of the AP if the AP does not detect a BSS on the second set of communication channels (e.g., even if a BSS is detected on the first set of communication channels), in an embodiment.

A device that has not yet joined a BSS, such as a client station (e.g., the client station 25-1 of FIG. 1, before the station 25-1 has joined a BSS that includes the AP 14) scans the at least two sets of communication channels to determine which BSS the client station will join, in an embodiment. In some embodiments, the client station is required to scan at least one set of communication channels for BSSs, and optionally can scan at least one other set of communication channels for BSSs. For example, the client station may be required to scan a second set of communication channels for BSSs, and have the option of scanning a first set of communication channels for BSSs.

In some embodiments, a client station joining a BSS utilizing one set of communication channels is required to report to an AP of the BSS the existence of a BSS that the client station detected on another set of communication channels. For example, the client station may be required to report the existence of a BSS that the station had detected on the second set of communication channels to the AP of a BSS, joined by the station, that utilizes the first set of communication channels. The AP may then be required to try to switch the BSS to the BSS of the second set of channels, for example.

Figure 11:
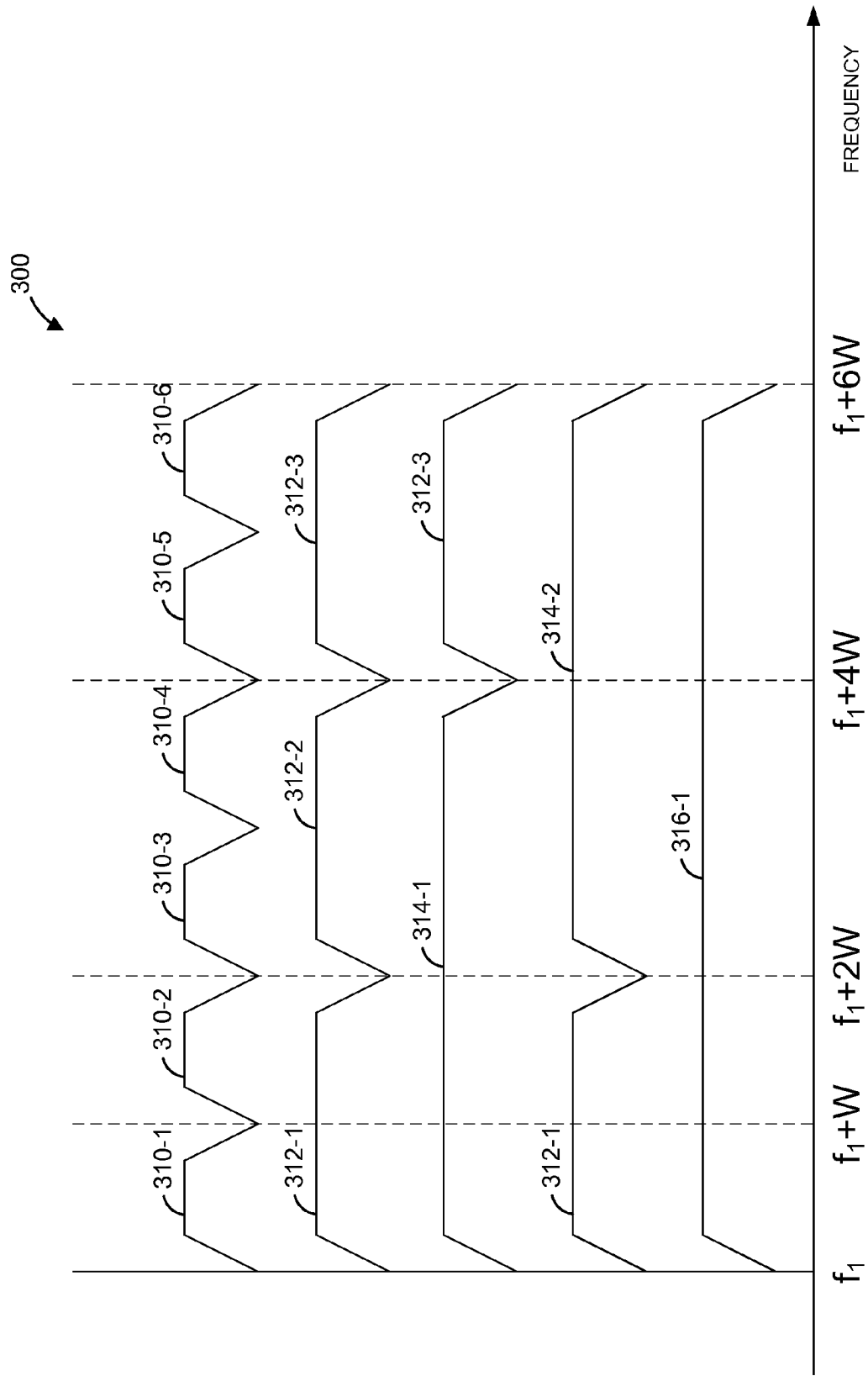
FIG. 11 is a diagram illustrating examples of a first set of channels utilized for data stream transmission by a communication system such as the system of FIG. 1, according to an embodiment.

FIG. 11 is a diagram 300 illustrating examples of a first set of channels 310 utilized for data stream transmission by a communication system such as the system 10 of FIG. 1, according to an embodiment. The channels 310 may be the communication channels of a BSS, in an embodiment. For example, the channels 310 may be the communication channels of a BSS corresponding to the WLAN 10 of FIGS. 1 and 2. In some embodiments, there may be more or fewer channels 310 than illustrated in FIG. 11, and/or the channels 310 may not all have the same bandwidth. In some embodiments, two adjacent channels 310 can be concatenated to form a channel 312. For example, channels 310-1 and 310-2 can be concatenated to form channel 312-1. Similarly, channels 310-3 and 310-4 can be concatenated to form channel 312-2. Moreover, in some embodiments, four adjacent channels 310 can be concatenated to form a channel 314. For example, channels 310-1 through 310-4 can be concatenated to form channel 314-1. Similarly, channels 310-3 through 310-6 can be concatenated to form channel 314-2. Further, in some embodiments, six adjacent channels 310 can be concatenated to form a channel 316. For example, channels 310-1 through 310-6 can be concatenated to form channel 316-1. Each channel 310 has a bandwidth of W, each channel 312 has a bandwidth of 2 W, each channel 314 has a bandwidth of 4 W, and the channel 316-1 has a bandwidth of 6 W, according to an embodiment. W is a suitable bandwidth such as 1 MHz, 5 MHz, 10 MHz, 20 MHz, etc., and the frequency $f_1$ shown in FIG. 11 is a suitable starting frequency, in some embodiments. In one scenario, the first set of channels 310 are 20 MHz channels (i.e., W=20 MHz) in the planned Chinese 5 GHz band allocated to IEEE 802.11 communications (i.e., 5725-5850 MHz), and the frequency f1 is 5727.5 MHz, for example.

A plurality of the channels 310 can be combined to form a composite channel. In some embodiments, a channel 310 can also be formed using only one of the channels 310. The composite channel can be used by a communication device (e.g., the AP 14 of FIG. 1) to transmit a data stream to another communication device (e.g., the client station 25-1 of FIG. 1). The data stream can include data units such as the data unit 50 of FIG. 3. In some embodiments, a composite channel is not limited to a contiguous frequency band. For example, a composite channel having a bandwidth of 4 W can be formed with channels 310-1, 310-2, 310-4, and 310-5. As another example, channels 310-1 and 310-4 can be combined to form a composite channel having a bandwidth of 2 W.

In an embodiment, the channels 310 are subject to combination rules similar to the component channels 80 of FIG. 4. For example, non-contiguous composite channels are not permitted, a smaller bandwidth composite channel (e.g., a channel 312) are not permitted to partially overlap a larger bandwidth composite channel (e.g., a channel 314), and/or only certain numbers of channels 310 can be combined to form a composite channel. In other embodiments, non-contiguous composite channels are permitted. While FIG. 11 illustrates an embodiment in which one, two, four, or six channels 310 may form a composite channel, more or fewer channels may be combined.

In an embodiment, the channels 310 are utilized for access control as well as communications. For example, a communication device (e.g., the AP 14 or client station 25-1 of FIG. 1) may determine whether each of the channels 310 is idle using techniques such as those discussed above (e.g., CCA techniques and/or control and response frames), and then form a composite communication channel using only idle channels 310, in an embodiment. In an embodiment, the channels 310 are also assigned priorities (e.g., primary, secondary, etc.) that affect which composite channels may be formed in certain scenarios. The priorities may be assigned in a manner similar to, and have an effect similar to, the priorities discussed above in connection with the access control channels 90, in an embodiment. For example, for purposes of determining whether a channel 310 is available to be used in forming a composite channel, one of the channels 310 having a lower priority is treated as busy (regardless of whether the channel 310 is actually busy) if another of the channels 310 having a higher priority is determined to be busy, in an embodiment. As another example, no transmission is permitted unless a primary channel of the channels 310 is idle, in an embodiment.

Figure 12:
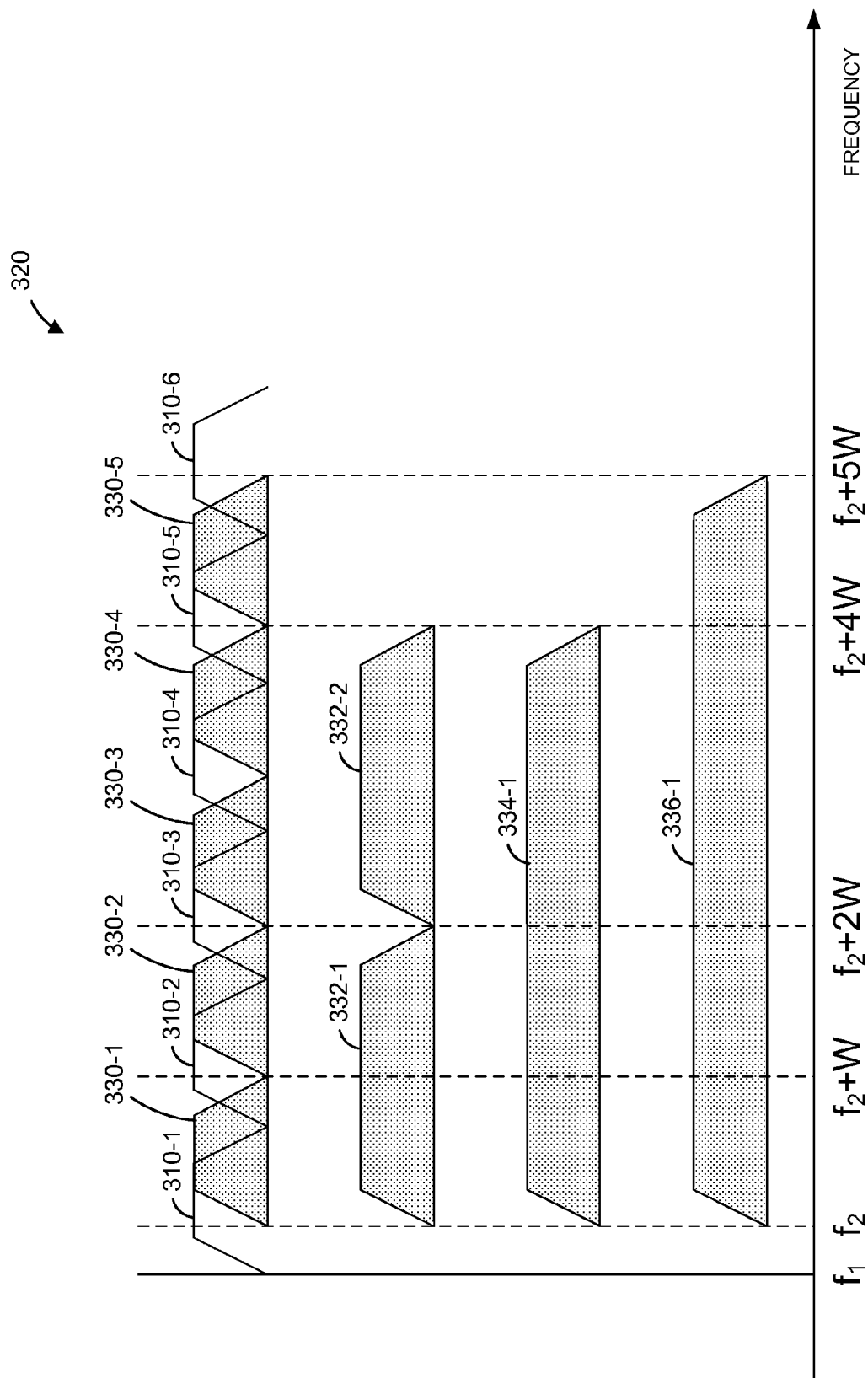
FIG. 12 is a diagram illustrating examples of a second set of channels utilized for data stream transmission by a communication system such as the system of FIG. 1, according to an embodiment.

FIG. 12 is a diagram 320 illustrating examples of a second set of channels 330 utilized for data stream transmission by a communication system such as the system 10 of FIG. 1, according to an embodiment. The channels 330 may be the communication channels of a BSS different than the BSS that utilizes the communication channels 310 for communications, in an embodiment. For example, the channels 330 may be the communication channels of a BSS corresponding to the WLAN 30 of FIG. 2. In an embodiment, the set of channels 330 overlaps the set of channels 310. For example, each of the channels 330 partially overlaps at least one of the channels 310, in an embodiment. In the diagram 320 of FIG. 12, the first set of channels 310 is shown merely to illustrate the overlap of channels in an example embodiment. In some embodiments, there may be more or fewer channels 330 than illustrated in FIG. 12, and/or the channels 330 may not all have the same bandwidth.

In some embodiments, two adjacent channels 330 can be concatenated to form a channel 332. For example, channels 330-1 and 330-2 can be concatenated to form channel 332-1. Similarly, channels 330-3 and 330-4 can be concatenated to form channel 332-2. Moreover, in some embodiments, four adjacent channels 330 can be concatenated to form a channel 334. For example, channels 330-1 through 330-4 can be concatenated to form channel 334-1. Further, in some embodiments, five adjacent channels 330 can be concatenated to form a channel 336. For example, channels 330-1 through 330-5 can be concatenated to form channel 336-1. Each channel 330 has a bandwidth of W, each channel 332 has a bandwidth of 2 W, each channel 334 has a bandwidth of 4 W, and the channel 336-1 has a bandwidth of 6 W, according to an embodiment. W is a suitable bandwidth such as 1 MHz, 5 MHz, 10 MHz, 20 MHz, etc., and the frequency $f_2$ shown in FIG. 12 is a suitable starting frequency, in some embodiments. In one scenario, the second set of channels 330 are 20 MHz channels (i.e., W=20 MHz) in the upper end of the United States 5 GHz band allocated to IEEE 802.11 communications (i.e., 5735-5835 MHz), and the frequency f2 is 5735 MHz, for example.

A plurality of the channels 330 can be combined to form a composite channel. In some embodiments, a composite channel can also be formed using only one of the channels 330. The composite channel can be used by a communication device (e.g., the AP 14 of FIG. 1) to transmit a data stream to another communication device (e.g., the client station 25-1 of FIG. 1). The data stream can include data units such as the data unit 50 of FIG. 3. In some embodiments, a composite channel is not limited to a contiguous frequency band. For example, a composite channel having a bandwidth of 4 W can be formed with channels 330-1, 330-2, 330-4, and 330-5. As another example, channels 330-1 and 330-4 can be combined to form a composite channel having a bandwidth of 2 W.

In an embodiment, the channels 330 are subject to combination rules similar to the component channels 80 of FIG. 4. For example, non-contiguous composite channels may not be permitted, a smaller bandwidth composite channel (e.g., a channel 332) may not be permitted to partially overlap a larger bandwidth composite channel (e.g., a channel 334), and/or only certain numbers of channels 330 may be combined to form a composite channel. While FIG. 12 illustrates an embodiment in which one, two, four, or five channels 330 may form a composite channel, more or fewer channels may be combined.

In an embodiment, the channels 330 are utilized for access control as well as communications. For example, a communication device (e.g., the AP 14 or client station 25-1 of FIG. 1) may determine whether each of the channels 330 is idle using techniques such as those discussed above (e.g., CCA techniques and/or control and response frames), and then form a composite communication channel using only idle channels 330, in an embodiment. In an embodiment, the channels 330 are also assigned priorities (e.g., primary, secondary, etc.) that affect which composite channels may be formed in certain scenarios. The priorities may be assigned in a manner similar to, and have an effect similar to, the priorities discussed above in connection with the access control channels 90, in an embodiment. For example, for purposes of determining whether a channel 330 is available to be used in forming a composite channel, a channel 330 having a lower priority is treated as busy (regardless of whether the channel 330 is actually busy) if a channel 330 having a higher priority is determined to be busy, in an embodiment. As another example, no transmission is permitted unless a primary channel of the channels 330 is idle, in an embodiment.

Figure 13:
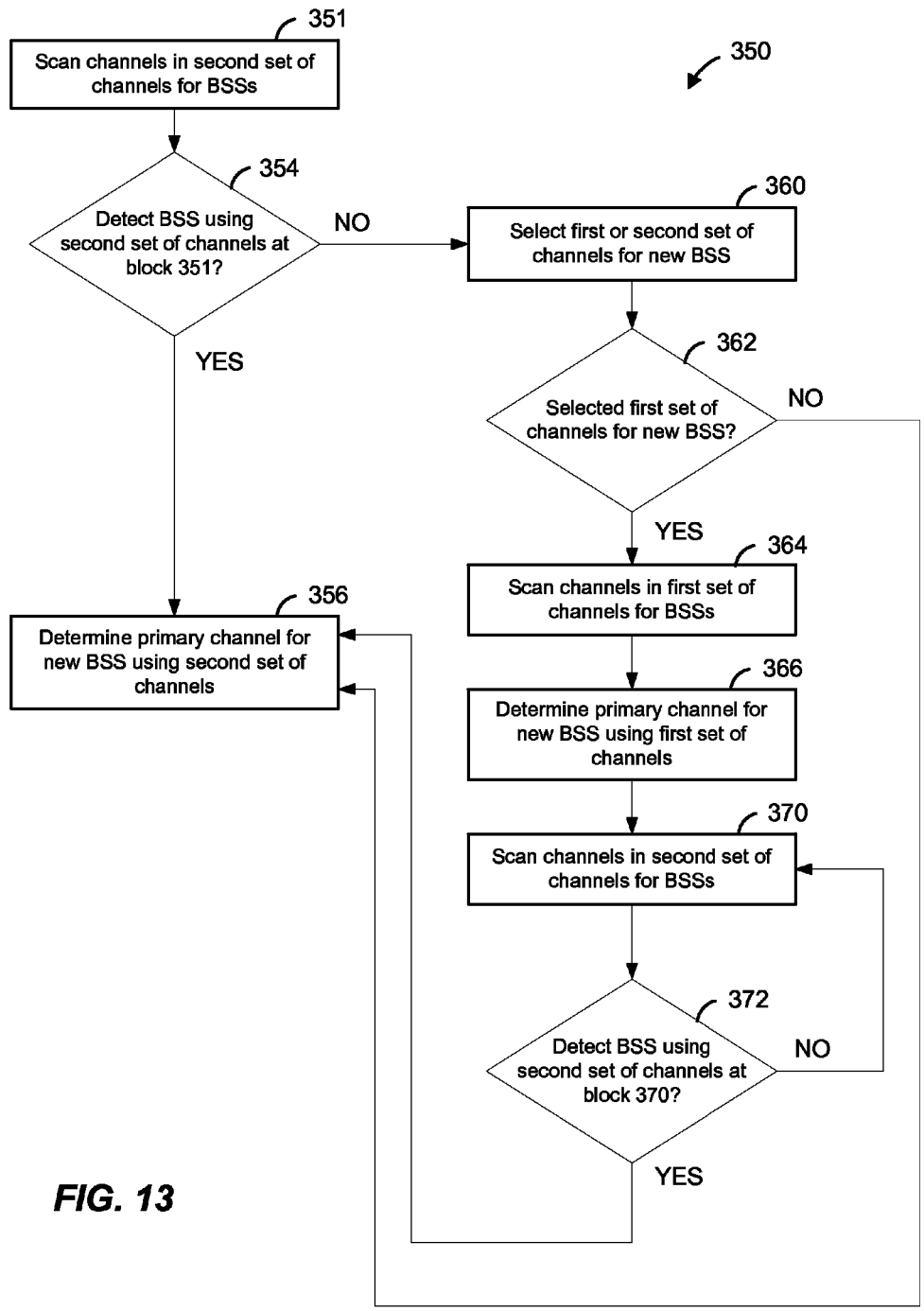
FIG. 13 is a flow diagram of an example method for selecting a set of channels for a basic service set, according to an embodiment.

FIG. 13 is a flow diagram 350 of an example method for selecting a set of channels for a new BSS. In some scenarios, a "new" BSS refers to a BSS that is being started. In other scenarios, a "new" BSS refers to a BSS for which a new set of channels is being utilized. Referring to FIG. 1, the network interface 16 (e.g., the MAC processing unit 18 and/or the PHY processing unit 20) of the AP 14 is configured to implement the method 350, in an embodiment. The first set of channels of the method 350 may correspond to the channels 310 and the second set of channels of the method 350 may correspond to the channels 330 described above in connection with FIGS. 11 and 12, for example. Merely for illustrative purposes, FIG. 13 will be described with reference to the example channels of FIGS. 11 and 12.

At block 351, channels in the second set of channels 330 are scanned for existing BSSs that utilize the channels 330 for communications. In some embodiments, each of the channels 330 is scanned for existing BSSs. In other embodiments, each channel of only a subset of one or more (but not all) of the channels 330 is scanned for existing BSSs. In some embodiments, a BSS that utilizes one or more of the communication channels 330 is determined to exist if communications are detected on one or more of the channels 330. For example, a BSS that utilizes one or more of the communication channels 330 is determined to exist if a training field is detected in a preamble of a data unit (e.g., the data unit 50 of FIG. 3) on one or more of the channels 330, in an embodiment. As another example, a BSS that utilizes one or more of the communication channels 330 is determined to exist if a signal having greater than a threshold level of energy is detected on or more of the channels 330, in an embodiment. As yet another example, a BSS that utilizes one or more of the communication channels 330 is determined to exist if a beacon frame (e.g., a beacon frame transmitted by an AP such as the AP 34 of FIG. 1) is detected on one or more of the channels 330, in an embodiment.

At block 354, it is determined whether at least one BSS utilizing the second set of channels 330 was detected at block 351. If it is determined that at least one BSS was detected, the flow proceeds to block 356. If it is determined that at least one BSS was not detected, the flow proceeds to block 360.

At block 356, at least a primary channel is determined for a new BSS that utilizes the second set of communication channels 330. In some embodiments, additional priorities (e.g., secondary, tertiary, etc.) are assigned to channels in the second set of channels 330. The primary and, in some embodiments, secondary, tertiary, etc. channels may be assigned in a manner similar to (and have an effect similar to) the priorities discussed above in connection with the access control channels 90, in an embodiment. In some embodiments, the determination at block 356 is based at least in part on the scan of the second set of channels 330 at block 351. For example, if the device performing the method 350 detected that another, existing BSS uses a particular channel of the communication channels 330 as a primary channel at block 351, the new BSS is not permitted to assign or use that particular channel as a primary channel, in an embodiment.

At block 360, either the first set of channels 310 or the second set of channels 330 is selected for a new BSS. In some embodiments, a higher selection priority is assigned to one of the two sets of channels 310 and 330. For example, a device implementing the method 350 (e.g., the AP 14 of FIG. 1) may automatically select the first set of channels 310 at the block 360. In other embodiments, suitable criteria for selecting either the first set of channels 310 or the second set of channels 330 are utilized.

At block 362, it is determined whether the first set of communication channels 310 was selected for the new BSS at block 360. If the first set of channels 310 was selected, the flow proceeds to block 364, in an embodiment. If the first set of channels 310 was not selected (i.e., the second set of channels 330 was selected), the flow proceeds to block 356, in an embodiment.

At block 364, channels in the first set of channels 310 are scanned for existing BSSs that utilize the channels 310 for communications. In some embodiments, each of the channels 310 is scanned for existing BSSs. In other embodiments, each channel of only a subset of one or more (but not all) of the channels 310 is scanned for existing BSSs. In some embodiments, a BSS that utilizes one or more of the communication channels 310 is determined to exist if communications are detected on one or more of the channels 310. For example, a BSS that utilizes one or more of the communication channels 310 is determined to exist if a training field is detected in a preamble of a data unit (e.g., the data unit 50 of FIG. 3) on one or more of the channels 310, in an embodiment. As another example, a BSS that utilizes one or more of the communication channels 310 is determined to exist if a signal having greater than a threshold level of energy is detected on or more of the channels 310, in an embodiment. As yet another example, a BSS that utilizes one or more of the communication channels 310 is determined to exist if a beacon frame (e.g., a beacon frame transmitted by an AP such as the AP 34 of FIG. 1) is detected on one or more of the channels 310, in an embodiment.

At block 366, at least a primary channel is determined for a new BSS that utilizes the first set of communication channels 310. In some embodiments, additional priorities (e.g., secondary, tertiary, etc.) are assigned to channels in the second set of channels 310. The primary and, in some embodiments, secondary, tertiary, etc. channels may be assigned in a manner similar to (and have an effect similar to) the priorities discussed above in connection with the access control channels 90, in an embodiment. In some embodiments, the determination at block 366 is based at least in part on the scan of the first set of channels 310 at block 364. For example, if the device performing the method 350 detected that another, existing BSS uses a particular channel of the channels 310 as a primary channel at block 364, the new BSS is not permitted to assign or use that particular channel as a primary channel, in an embodiment.

At block 370, channels in the second set of channels 330 are scanned for existing BSSs. The scan performed at block 370 may be similar to the scan performed at block 351, for example. In some embodiments, the scan at block 370 is performed periodically after the new BSS has been configured (e.g., by determining a primary channel of the new BSS at block 366).

At block 372, it is determined whether at least one BSS utilizing the second set of channels 330 was detected at block 370. In an embodiment, if it is determined that at least one BSS was detected, the BSS of the device performing the method 350 (e.g., the BSS of the AP 14 of FIG. 1) is required to switch from utilizing the first set of communication channels 310 to utilizing the second set of communication channels 330, and the flow proceeds to block 356. In an embodiment, if it is determined that at least one BSS was not detected, the flow proceeds back to block 370. In some embodiments, the sequence of steps at blocks 370 and 372 repeats (e.g., periodically) until at least one BSS is detected utilizing the second set of channels 330, at which point the flow proceeds to block 356.

In some embodiments, the blocks illustrated in the flow diagram 350 occur in a different order. For example, the scan of the first set of channels 310 at block 364 may occur before the scan of the second set of channels at block 351, in an embodiment. In some embodiments, certain blocks illustrated in the flow diagram 350 are skipped. For example, the steps at blocks 370 through 372 may be skipped, in some embodiments.

Figure 14:
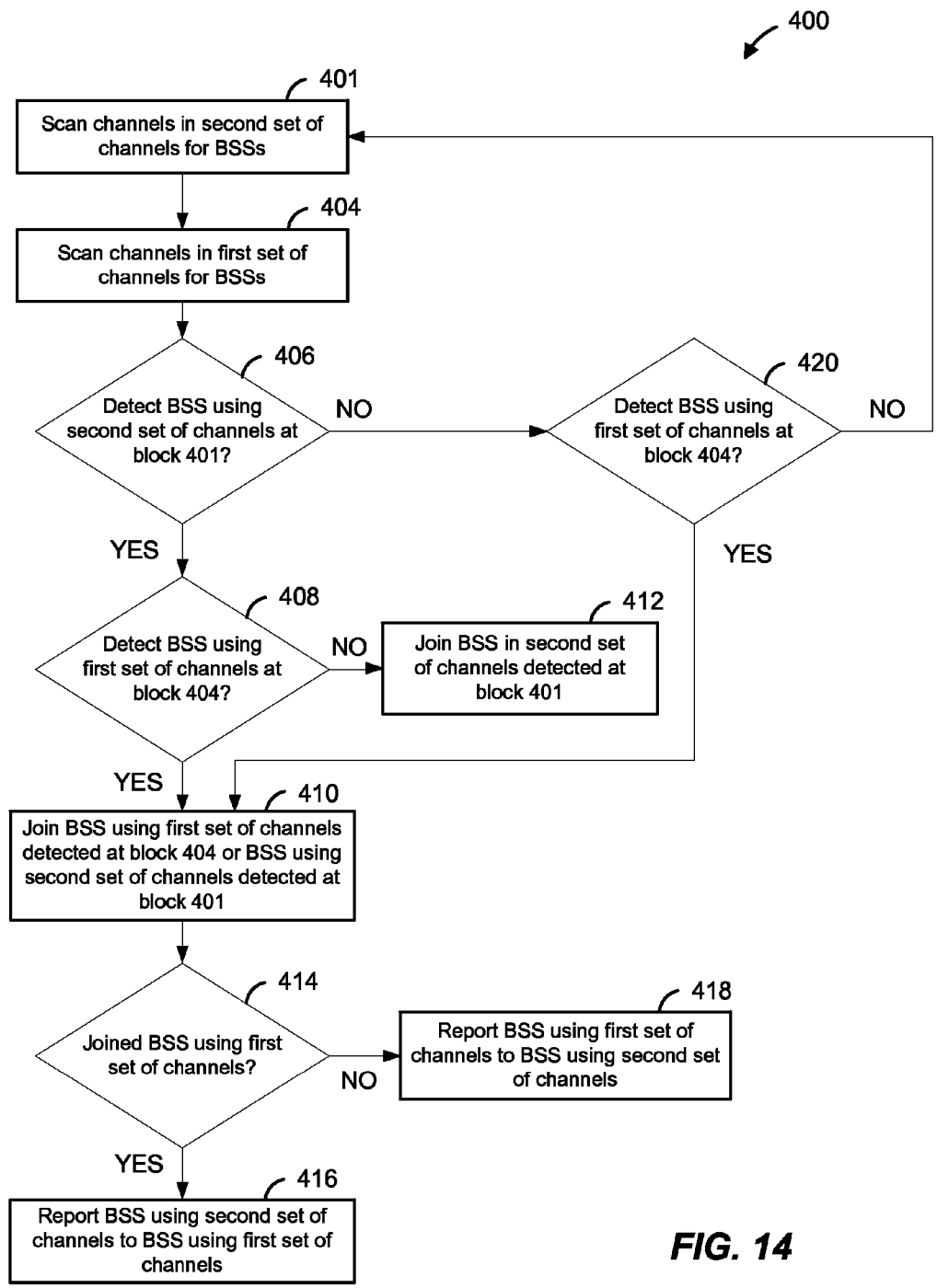
FIG. 14 is a flow diagram of an example method for selecting a basic service set to be joined, according to an embodiment.

FIG. 14 is a flow diagram 400 of an example method for selecting a BSS to be joined. Referring to FIG. 1, the network interface 27 (e.g., the MAC processing unit 28 and/or the PHY processing unit 29) of the client station 25-1 is configured to implement the method 400, in an embodiment. The first set of channels of the method 400 may correspond to the channels 310 and the second set of channels of the method 400 may correspond to the channels 330 described above in connection with FIGS. 11 and 12, for example. Merely for illustrative purposes, FIG. 14 will be described with reference to the example channels of FIGS. 11 and 12.

At block 401, channels in the second set of channels 330 are scanned for existing BSSs that utilize the channels 330 for communications. In some embodiments, each of the channels 330 is scanned for existing BSSs. In other embodiments, each channel of only a subset of one or more (but not all) of the channels 330 is scanned for existing BSSs. In some embodiments, a BSS that utilizes one or more of the communication channels 330 is determined to exist if communications are detected on one or more of the channels 330. For example, a BSS that utilizes one or more of the communication channels 330 is determined to exist if a training field is detected in a preamble of a data unit (e.g., the data unit 50 of FIG. 3) on one or more of the channels 330, in an embodiment. As another example, a BSS that utilizes one or more of the communication channels 330 is determined to exist if a signal having greater than a threshold level of energy is detected on or more of the channels 330, in an embodiment.

At block 404, channels in the first set of channels 310 are scanned for existing BSSs that utilize the channels 310 for communications. In some embodiments, each of the channels 310 is scanned for existing BSSs. In other embodiments, each channel of only a subset of one or more (but not all) of the channels 310 is scanned for existing BSSs. In some embodiments, a BSS that utilizes one or more of the communication channels 310 is determined to exist if communications are detected on one or more of the channels 310. For example, a BSS that utilizes one or more of the communication channels 310 is determined to exist if a training field is detected in a preamble of a data unit (e.g., the data unit 50 of FIG. 3) on one or more of the channels 310, in an embodiment. As another example, a BSS that utilizes one or more of the communication channels 310 is determined to exist if a signal having greater than a threshold level of energy is detected on or more of the channels 310, in an embodiment. The threshold can be the same as or different than a threshold used at block 401, for example.

At block 406, it is determined whether at least one BSS utilizing the second set of channels 330 was detected at block 401. In an embodiment, if it is determined that at least one BSS was detected, the flow proceeds to block 408. In an embodiment, if it is determined that at least one BSS was not detected, the flow proceeds to block 420.

At block 408, it is determined whether at least one BSS utilizing the first set of communication channels 330 was detected at block 404. In an embodiment, if it is determined that at least one BSS was detected, the flow proceeds to block 410. In an embodiment, if it is determined that at least one BSS was not detected, the flow proceeds to block 412.

At block 410, a BSS utilizing the first set of channels 310 that was detected at block 404 or a BSS utilizing the second set of channels 330 that was detected at block 401 is joined. In some embodiments, a device performing the method 400 (e.g., the client station 25-1 of FIG. 1) joins the BSS at least in part by exchanging authentication information with an AP of the BSS (e.g., the AP 14 of FIG. 1). In some embodiments, a device performing the method 400 joins the BSS at least in part by exchanging capability information with an AP of the BSS. If a first BSS utilizing the first set of communication channels 310 was detected at block 404 and a second BSS utilizing the second set of communication channels 330 was detected at block 401, a device performing the method 400 may choose which BSS to join, in an embodiment. For example, a higher selection priority is assigned to one of the two sets of channels 310 and 330, in an embodiment. For example, a device implementing the method 400 may automatically select the first set of channels 310 at the block 410.

At block 412, a BSS utilizing the second set of channels 330 that was detected at block 401 is joined. In some embodiments, a device performing the method 400 (e.g., the client station 25-1 of FIG. 1) joins the BSS at least in part by exchanging authentication information with an AP of the BSS (e.g., the AP 14 of FIG. 1). In some embodiments, a device performing the method 400 joins the BSS at least in part by exchanging capability information with an AP of the BSS.

At block 414, it is determined whether a BSS that utilizes the first set of communication channels 310 was joined. If a BSS that utilizes the first set of channels 310 was joined, the flow proceeds to block 416. If a BSS that utilizes the first set of channels 310 was not joined, the flow proceeds to block 418.

At block 416, a BSS utilizing the second set of communication channels 330 that was detected during the scan at block 401 is reported. In some embodiments, the detected BSS is reported to an AP (e.g., the AP 14 of FIG. 1) associated with the BSS utilizing the first set of communication channels 310 that was joined at block 410. In response to the report, the AP reconfigures the BSS utilizing the first set of channels 310 to instead utilize the second set of channels 330 and/or determines whether the BSS is permitted to be reconfigured to utilize the channels 330, in an embodiment.

At block 418, a BSS utilizing the first set of communication channels 310 that was detected during the scan at block 408 is reported. In some embodiments, the detected BSS is reported to an AP (e.g., the AP 14 of FIG. 1) associated with the BSS utilizing the second set of communication channels 330 that was joined at block 410. In response to the report, the AP reconfigures the BSS utilizing the second set of channels 330 to instead utilize the first set of channels 310 and/or determines whether the BSS is permitted to be reconfigured to utilize the channels 310, in an embodiment.

At block 420, it is determined whether at least one BSS utilizing the first set of communication channels 330 was detected at block 404. In an embodiment, if it is determined that at least one BSS was detected, the flow proceeds to block 410. In an embodiment, if it is determined that at least one BSS was not detected, the flow proceeds back to block 401. In some embodiments, the sequence of steps at blocks 401, 404, 406, and 420 repeats (e.g., periodically) until at least one BSS is detected utilizing either the first set of channels 310 or the second set of channels 330.

In some embodiments, the blocks illustrated in the flow diagram 400 occur in a different order. For example, the scan of the first set of channels 310 at block 404 may instead occur after the determination at block 406 and before the determination at block 408, in an embodiment. In some embodiments, certain blocks illustrated in the flow diagram 400 are skipped. For example, the scan of the first set of channels 310 at block 404 may be skipped, and the flow may proceed directly to the block 412, if a BSS utilizing the second set of channels 330 is detected during the scan at block 401, in an embodiment.

At least some of the various blocks, operations, and techniques described above may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, implemented in a communication device, of determining an available channel bandwidth in a communication system, wherein the communication system utilizes i) a set of component channels for transmitting data streams and ii) a set of access control channels, and wherein each of at least some of the access control channels partially overlaps, in frequency, at least one of the component channels, the method comprising:

determining, at the communication device, whether a primary channel of the access control channels is idle, wherein the primary channel partially overlaps, in frequency, at least a first one of the component channels;

determining, at the communication device, that a composite channel includes one or more of the component channels based at least on a determination of whether the primary channel is idle; and causing, at the communication device, the communication device to transmit a signal via the composite channel after determining that the composite channel includes one or more of the component channels.

2. The method according to claim 1, further comprising determining, at the communication device, whether a secondary channel of the access control channels is idle, wherein determining that the composite channel includes the one or more component channels is further based on a determination of whether the secondary channel is idle.

3. The method according to claim 2, wherein:

the secondary channel partially overlaps at least the first component channel, and determining that the composite channel includes the one or more component channels includes determining that the composite channel includes the first component channel when it is determined that i) the primary channel is idle, and ii) the secondary channel is idle.

4. The method according to claim 3, further comprising receiving i) a first acknowledgement on the primary channel, and ii) a second acknowledgement on the secondary channel.

5. The method according to claim 2, wherein:

the secondary channel partially overlaps at least the first component channel, determining that the composite channel includes the one or more component channels includes determining that the composite channel does not include the first component channel when it is determined that at least one of i) the primary channel, and ii) the secondary channel, is busy.

6. The method according to claim 1, wherein no two of the component channels overlap, and wherein no two of the access control channels overlap.

7. The method according to claim 6, wherein each of the component channels has a first bandwidth and each of the access control channels has a second bandwidth, and wherein the first bandwidth is the same as the second bandwidth.

8. The method according to claim 1, wherein a combined bandwidth of all of the component channels is greater than a combined bandwidth of all of the access control channels.

9. The method according to claim 1, further comprising determining, at the communication device, which remaining channels of the access control channels are idle, wherein:
- the remaining channels consist of access control channels other than the primary channel, and
- determining that the composite channel includes the one or more component channels is further based on a determination of which of the remaining channels are idle.

10. The method according to claim 9, wherein causing the signal to be transmitted via the composite channel includes:
- causing a first portion of a data unit to be transmitted via a channel consisting of one or more access control channels that are determined to be idle; and
- causing a second portion of the data unit to be transmitted via the composite channel.

11. The method according to claim 10, wherein the first portion of the data unit is at least a portion of a preamble.

12. The method according to claim 1, wherein determining whether the primary channel is idle includes at least one of i) detecting whether a threshold level of signal energy is received on the primary channel, or ii) detecting whether a valid signal is received on the primary channel.

13. The method according to claim 1, wherein determining whether the primary channel is idle includes:
- transmitting a first control frame on the primary channel; and
- detecting whether a first response frame is received on the primary channel.

14. The method according to claim 13, further comprising determining, at the communication device, whether a secondary channel of the access control channels is idle, wherein determining whether the secondary channel is idle includes:
- transmitting a second control frame on the secondary channel; and
- detecting whether a second response frame is received on the secondary channel.

15. A communication device, comprising:
- a network interface configured to
  - determine whether a primary channel of a set of access control channels is idle, wherein each of the access control channels partially overlaps, in frequency, at least one channel of a set of component channels,
  - determine that a composite channel includes one or more of the component channels based at least on a determination of whether the primary channel is idle, and
  - cause a signal to be transmitted via the composite channel after determining that the composite channel includes one or more of the component channels.

16. The communication device according to claim 15, wherein the network interface is configured to
- determine whether a secondary channel of the access control channels is idle, and
- determine that the composite channel includes the one or more component channels based on a determination of whether the secondary channel is idle.

17. The communication device according to claim 15, wherein no two of the component channels overlap, and wherein no two of the access control channels overlap.

18. The communication device according to claim 15, wherein each of the component channels has a first bandwidth and each of the access control channels has a second bandwidth, and wherein the first bandwidth is the same as the second bandwidth.

19. The communication device according to claim 15, wherein a combined bandwidth of all of the component channels is greater than a combined bandwidth of all of the access control channels.

20. The communication device according to claim 15, wherein the network interface is configured to determine whether the primary channel is idle based on at least one of i) detecting whether a threshold level of signal energy is received on the primary channel or ii) detecting whether a valid signal is received on the primary channel.

21. The communication device according to claim 15, wherein the network interface is configured to determine whether the primary channel is idle at least in part by i) transmitting a control frame on the primary channel, and ii) detecting whether a response frame is received on the primary channel.

22. A method, implemented in a communication device, of determining an available channel bandwidth in a communication system, wherein the communication system utilizes i) a set of component channels and ii) at least one channel of a set of access control channels for transmitting data streams, the method comprising:
- determining, at the communication device, which channels of the set of access control channels are idle, wherein each of the access control channels partially overlaps, in frequency, at least one of the component channels;
- determining, at the communication device, that a composite channel includes one or more channels of a set of channels, wherein the set of channels is chosen from i) the set of component channels and ii) the set of access control channels based at least on a determination of which of the access control channels are idle; and
- causing, at the communication device, the communication device to transmit a signal via the composite channel after determining that the composite channel includes one or more channels of a set of channels.

23. The method according to claim 22, wherein determining that the composite channel includes the one or more channels includes not permitting the composite channel to be coextensive with a first subset of one or more of the component channels.

24. The method according to claim 23, wherein:
- determining that the composite channel includes the one or more channels further includes i) not permitting the composite channel to be coextensive with a second subset of one or more of the component channels, and ii) not permitting the composite channel to be coextensive with a third subset of one or more of the component channels, and
- the first subset of component channels includes the second subset of component channels and the third subset of component channels.

25. A communication device, comprising:
- a network interface configured to
  - determine which channels of a set of access control channels are idle, wherein each of the access control channels partially overlaps, in frequency, at least one channel of a set of component channels;
  - determine that a composite channel includes one or more channels of a set of channels, wherein the set of channels is chosen from i) the set of component channels and ii) the set of access control channels based at least on a determination of which of the access control channels are idle; and
  - cause a signal to be transmitted via the composite channel after determining that the composite channel includes one or more channels of a set of channels.

26. The communication device according to claim 25, wherein the network interface is configured to determine that the composite channel includes the one or more channels at least by not permitting the composite channel to be coextensive with a first subset of one or more of the component channels.

27. The communication device according to claim 26, wherein:
- the network interface is configured to determine that the composite channel includes the one or more channels at least by further i) not permitting the composite channel to be coextensive with a second subset of one or more of the component channels, and ii) not permitting the composite channel to be coextensive with a third subset of one or more of the component channels, and
- the first subset of component channels includes the second subset of component channels and the third subset of component channels.

* * * * *